(12) United States Patent  
Maassarani

(10) Patent No.: US 8,141,955 B1
(45) Date of Patent: Mar. 27, 2012

(54) SEAT BACK HEADREST

(76) Inventor: Sami Maassarani, Troy, MI (US)

( * ) Notice: Subject to any disclaimer, the term of this patent is extended or adjusted under 35 U.S.C. 154(b) by 0 days.

(21) Appl. No.: 12/946,109

(22) Filed: Nov. 15, 2010

(51) Int. Cl.
*A47C 7/36* (2006.01)

(52) U.S. Cl. .................... 297/393; 297/397

(58) Field of Classification Search ............. 297/397, 297/400, 401, 402, 216.12, 393, 399, 408
See application file for complete search history.

(56) References Cited

U.S. PATENT DOCUMENTS

| | | | | |
|---|---|---|---|---|
| 48,586 | A * | 7/1865 | Phelps | 297/401 |
| 283,533 | A * | 8/1883 | Taylor | 297/401 |
| 471,049 | A * | 3/1892 | Barth | 297/398 |
| 2,464,435 | A | 3/1949 | Conradt | |
| 2,560,925 | A * | 7/1951 | Brown | 297/298 |
| 2,582,571 | A | 1/1952 | Thoma | |
| 2,642,927 | A | 6/1953 | Rising | |
| 3,012,819 | A | 12/1961 | Mungovan | |
| 3,062,586 | A | 11/1962 | Rowland | |
| 3,185,497 | A | 5/1965 | Lagace | |
| 3,205,005 | A | 9/1965 | Brown | |
| 3,226,159 | A | 12/1965 | Binding | |
| 3,283,344 | A | 11/1966 | Blanchard | |
| 3,722,951 | A * | 3/1973 | Ezquerra | 297/488 |
| 3,946,452 | A | 3/1976 | Eary, Sr. | |
| 4,440,443 | A | 4/1984 | Nordskog | |
| 4,565,408 | A | 1/1986 | Palley | |
| 4,607,885 | A * | 8/1986 | del Fierro | 297/397 |
| 4,738,488 | A | 4/1988 | Camelio | |
| 5,220,700 | A | 6/1993 | Liu | |
| 5,411,468 | A | 5/1995 | Chen | |
| 5,505,523 | A | 4/1996 | Wang | |
| 5,531,505 | A | 7/1996 | Baetz et al. | |
| 5,580,133 | A | 12/1996 | Knox et al. | |
| 5,752,742 | A | 5/1998 | Kerner et al. | |
| 5,974,607 | A | 11/1999 | Smith | |
| 5,975,638 | A | 11/1999 | Schreiner | |
| 5,997,091 | A | 12/1999 | Rech et al. | |
| 6,116,691 | A | 9/2000 | Reece | |
| 6,123,389 | A | 9/2000 | O'connor et al. | |
| 6,216,298 | B1 | 4/2001 | Oliveira | |
| 6,220,668 | B1 | 4/2001 | Scheffzuck | |
| 6,266,825 | B1 | 7/2001 | Floyd | |
| 6,289,538 | B1 | 9/2001 | Fidge | |
| 6,305,749 | B1 | 10/2001 | O'connor et al. | |
| 6,394,544 | B1 | 5/2002 | Bieven et al. | |
| 6,513,871 | B2 | 2/2003 | Bartels | |
| 6,607,245 | B1 | 8/2003 | Scher | |
| 6,641,220 | B2 | 11/2003 | Clegg | |
| 6,641,221 | B1 | 11/2003 | Katlunger | |
| 6,758,526 | B2 | 7/2004 | Marbutt | |

(Continued)

*Primary Examiner* — Milton Nelson, Jr.
(74) *Attorney, Agent, or Firm* — Young Basile Hanlon & MacFarlane, P.C.

(57) ABSTRACT

A headrest includes at least one seat back mounting member and a connector coupling a cushion to the mounting member. The cushion connector is movable when the mounting member is invertingly mounted on the seat back to deploy the cushion at different angular positions. The mounting member may be a flexible wire bendable to accommodate different seat back sizes and to mount the headrest about the seat back. Alternately, the cushion connector is mountable in one or more different angled bores for deploring the cushion at different angles. Alternately, a hinge may be coupled to the connector to movably deploy a cushion at different angular positions. Alternately, the cushion may be pivotally mounted in a recess in the seat back and deployable from a retracted position to at least one forward extending deployed position. The cushion is also extensible relative to the seat back.

7 Claims, 18 Drawing Sheets

U.S. PATENT DOCUMENTS

| | | |
|---|---|---|
| 6,786,554 B1 | 9/2004 | Zahiri |
| 6,789,851 B2 | 9/2004 | Smith |
| 6,938,958 B2 | 9/2005 | Gold et al. |
| 6,951,367 B1 | 10/2005 | Dinnan |
| 6,973,691 B1 | 12/2005 | Cordova et al. |
| 7,004,545 B2 | 2/2006 | Miller |
| 7,055,908 B1 | 6/2006 | Williams |
| 7,097,243 B2 | 8/2006 | Verbovszky |
| 7,478,874 B2 * | 1/2009 | Figenser et al. ......... 297/216.13 |
| 7,530,634 B1 | 5/2009 | Mortazavi et al. |
| 7,628,456 B1 | 12/2009 | Swartz |
| 7,644,990 B2 | 1/2010 | Pearson |
| 2001/0040401 A1 | 11/2001 | Lin |
| 2001/0054837 A1 | 12/2001 | O'connor |
| 2002/0043831 A1 * | 4/2002 | Alsup ...................... 297/216.12 |
| 2002/0067063 A1 * | 6/2002 | Taborro ...................... 297/397 |
| 2002/0084685 A1 | 7/2002 | Lee |
| 2002/0140262 A1 | 10/2002 | Ossandum et al. |
| 2003/0038521 A1 | 2/2003 | Johnson |
| 2003/0127899 A1 | 7/2003 | Smith |
| 2003/0137176 A1 | 7/2003 | Jones |
| 2003/0137177 A1 | 7/2003 | Nyman |
| 2003/0151279 A1 | 8/2003 | Fowler |
| 2004/0007910 A1 | 1/2004 | Skelly |
| 2005/0173961 A1 | 8/2005 | Morphew et al. |
| 2006/0244300 A1 | 11/2006 | Watson Savage |
| 2007/0273194 A1 | 11/2007 | Fraser |
| 2008/0018158 A1 | 1/2008 | Pos |

* cited by examiner

SEAT BACK HEADREST

BACKGROUND

In order to alleviate the neck strain associated with a person trying to sleep while seated in a seat, such as a vehicle seat, airplane seat, train seat, etc., and maintaining his or her head in a generally upright, vertical position, a variety of different headrests have been devised for supporting a portion of the user's head, such as each side cheek or in a fully face encircling manner.

Maintaining a sleeping person's head in a generally upright position while the person is sleeping in a seat is particularly important from a safety standpoint for small children who frequently fall asleep while riding in a vehicle, airplane, or train.

The various devised headrests are either designed as part of the vehicle head restraint or are portable and removably attachable to the seatback for deployment and use. However, the previously devised headrests are either cumbersome or unsightly to deploy and attach to a seat back or, do not have easily adjustable positions to enable use of the headrest with different sized individuals or with children as the children grow.

It would be desirable to provide a seat headrest which overcomes these difficulties and provides ease of attachment and ease of adjustability.

SUMMARY

A seat back headrest is mountable on a seat back for supporting a portion of a user's head when seated in the seat.

In one aspect, the headrest includes:

A seat back mounting member invertingly mountable over a top edge of a seat back in one of first and second positions.

A cushion is adapted to support the weight of a portion of a user's head.

A cushion connector couples the cushion to the mounting member.

The cushion connector is movable between a first position when the mounting member is in a first position on the seat back and a shifted second position when the mounting member is in the second positions on the seat back to orient the cushion in one of first and second positions relative to the seat back.

The cushion can be a single cushion for supporting a side of a user's head or a continuous cushion extending between two ends coupled to two seat back mounting members for supporting either side or a front portion of the user's head.

In one aspect, the cushion connector includes:

A hinge having first and second pivotally connected hinge portions, the first hinge portion fixedly coupled to the mounting member; and the second hinge portion being pivotally movable from a first position relative to the first hinge member when the mounting member is in the first position on the seat back and a second position relative to the first hinge portion when the mounting member is in the inverted second position to deploy the cushion in one of two angular positions relative to the seat back. The hinge has a generally horizontally extending pivot axis when mounted on the seat back. In another aspect a flexible rod having a portion carrying the cushion and a mounting portion engagable with a seat back. The rod is a flexible rod capable of bending to a different shape.

The rod may have an inverted generally U-shaped channel between a pair of seat back engagement portions.

In another aspect, the rod has a pair of mounting portions coupled to opposite ends of the rod, the cushion extending substantially between the pair of mounting portions on the rod. Interlocking portions are carried on the two free ends of the connector for releasably locking a connector about a seat back.

In another aspect, a combination of a vehicle seat and a headrest includes:

In combination a vehicle seat having a generally upright seat back with an upper end, opposed side edges, a front surface and a back surface, and a headrest. At least one bore extending into the seat back from an open end at the front surface of the seat back, a portable headrest having a connector releasably mountable in the bore in the seat back and a cushion carried by the connector for weight bearing support of a seat user's head.

In a modification of this aspect, the at least one bore includes two generally horizontally spaced bores formed in the seat back, each extending from an open end at the front surface of the seat back. Another connector removable in one of the bores in the seat back and a cushion carried by the connectors for weight bearing support of a seat user's head.

A separate cushion may be coupled to each connector. Alternately, a single cushion may be coupled to both connectors.

The connector may include a hinge having first and second pivotally connected hinge portions, the first hinge portion fixedly coupled to the connector; and the second hinge portion coupled to the cushion and pivotally movable from a first position relative to the first hinge member when the mounting member is in the first position on the seat back and a second position relative to the first hinge portion when the mounting member is in the inverted second position to deploy the cushion in one of two angular positions relative to the seat back.

In one aspect, the one bore and the seat back extends substantially horizontally into the seat back. In another aspect, a second is disposed in the seat back at a down extending angle relative to the first bore. The two different angled bores allow selective insertion of the cushion connector therein for disposing the cushion at different angles relative to the seat back.

In another aspect, a combined vehicle seat and headrest includes a recess formed in the front surface of the seat back; and a cushion movable mountable in the recess for movement between a retracted position wherein the cushion is disposed in the recess in the seat back to at least one forward extending use position for weight bearing support of a seat user's head.

Alternately, a spring biased detent pin fixedly carried by the seat back; and a plurality of circumferentially spaced detents carried on a member fixed about a pivot axis of the cushion for movable positioning of the cushion between a plurality of use positions defined by the detents.

In another aspect, extension members telescopingly engage each other and one end of the cushion to provide extensible movement of the cushion relative to the seat back. Alternately, one or both cushion ends are mounted on sliders movable within a fixed track in the seat back for extension and retraction movement.

BRIEF DESCRIPTION OF THE DRAWING

The various features, advantages and other use of the present invention become more apparent by referring to the following detailed description and drawing in which.

DETAILED DESCRIPTION

Figure 1:
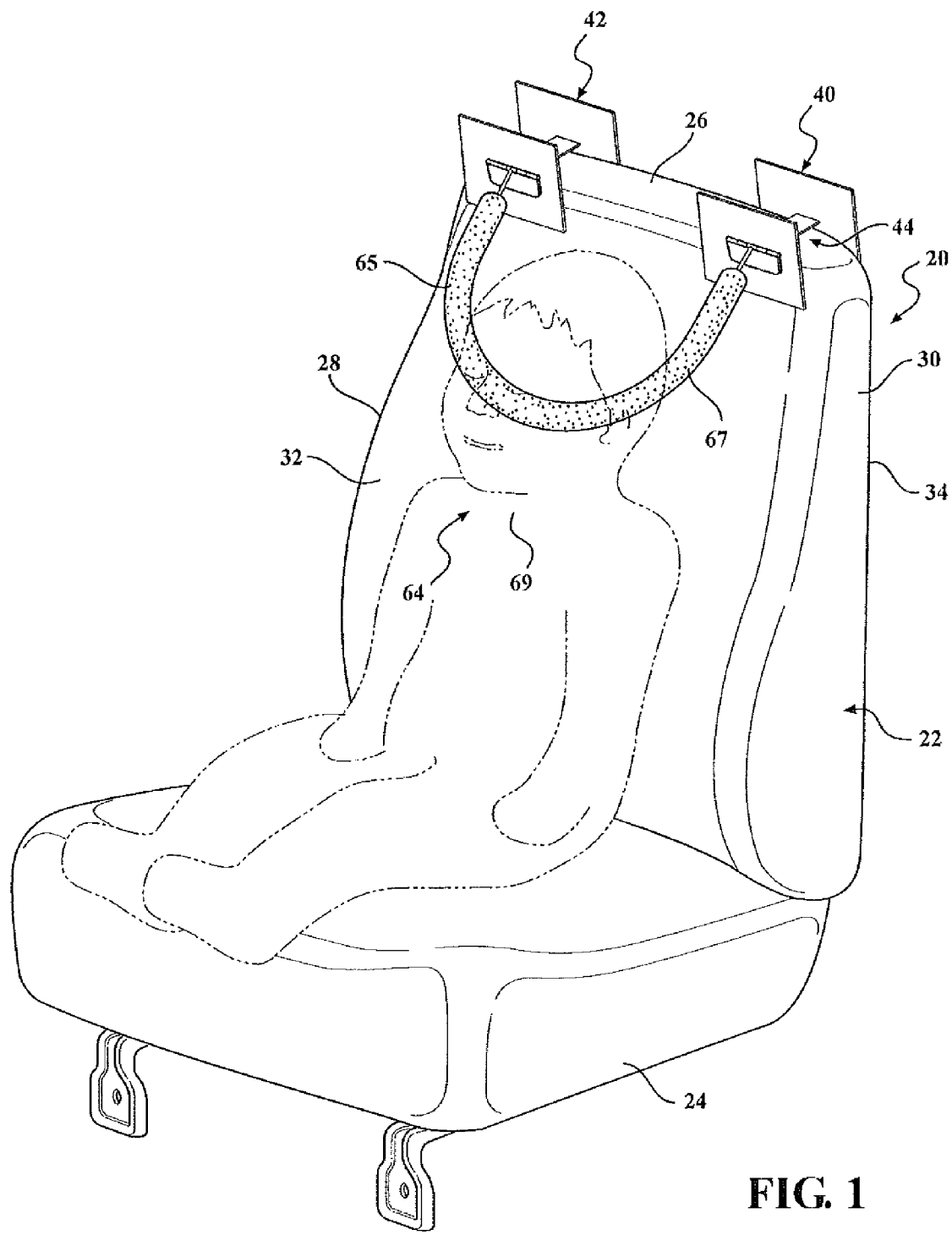
FIG. 1 is a perspective view of one aspect of a seat back head rest.

Referring now to the drawing and to FIG. 1 in particular, there is depicted one aspect of a headrest usable on a seat 20. By way of example only, the seat 20 may be any type of seat, such as vehicle seat, an airplane seat, a train seat or a seat used in an office, work space or home. The seat 20 has a seat back 22 and a seat bottom 24. Depending upon the application, the seat back 22 may be rigidly fixed to the seat bottom 24 or may be pivotal from in a more generally upright position shown in FIG. 1 to an angled position over the seat bottom 24.

For purposes of the following description, the seat back 22 includes a top edge 26, opposed side edges 28 and 30, a front surface 32 and an opposed rear surface 34.

One aspect of a headrest 40 is shown in FIGS. 1-5. The headrest 40 is designed as a portable headrest for removable mounting over the top edge 26 of the seat back 22. The headrest 40 includes one or a pair of mounting members 42 and 44. The mounting members 42 and 44 are configured for releasable mounting over the top edge 26 of the seat back 22 and are in substantial contact with the front surface 32 and the rear surface 34 of the seat back 22.

By way of example only, each mounting member 42 and 44 is identically constructed of a front seat engagement member 46 in a form of a planar plate and a like rear seat engagement member 48, also in the form of an enlarged planar plate. The large surface area of the front and rear plates 46 and 48 provides a secure mounting for the headrest 40 on the seat back 22.

A strap 50 is fixed to and interconnects the front and rear plates 46 and 48. The strap 50 may be a single strip of plastic or metal material which is integrally formed with or attached to the front and rear plates 46 and 48.

Alternately, the strap 50 may be formed of two members, one attached to each of the front and rear plates 46 and 48 and telescopingly engaged in a tight friction fit. This enables the strap 50 to be telescopingly elongated or reduced in length so as to vary the spacing between the front and rear plates 46 and 48 to enable the mounting members 42 or 44 to be securely affixed to any thickness of the seatback 22.

For purposes of the following description of the use and operation of the headrest 40, in the first mounting or use position where the mounting members 42 and 44 are securely mounted over the top edge 26 of the seat back 24, the front member 46 has an upper edge 52 and a lower edge 54. Similarly, the rear plate or member 48 of each mounting member 42 and 44 has an upper edge 56 and a lower edge 58.

Figure 3:
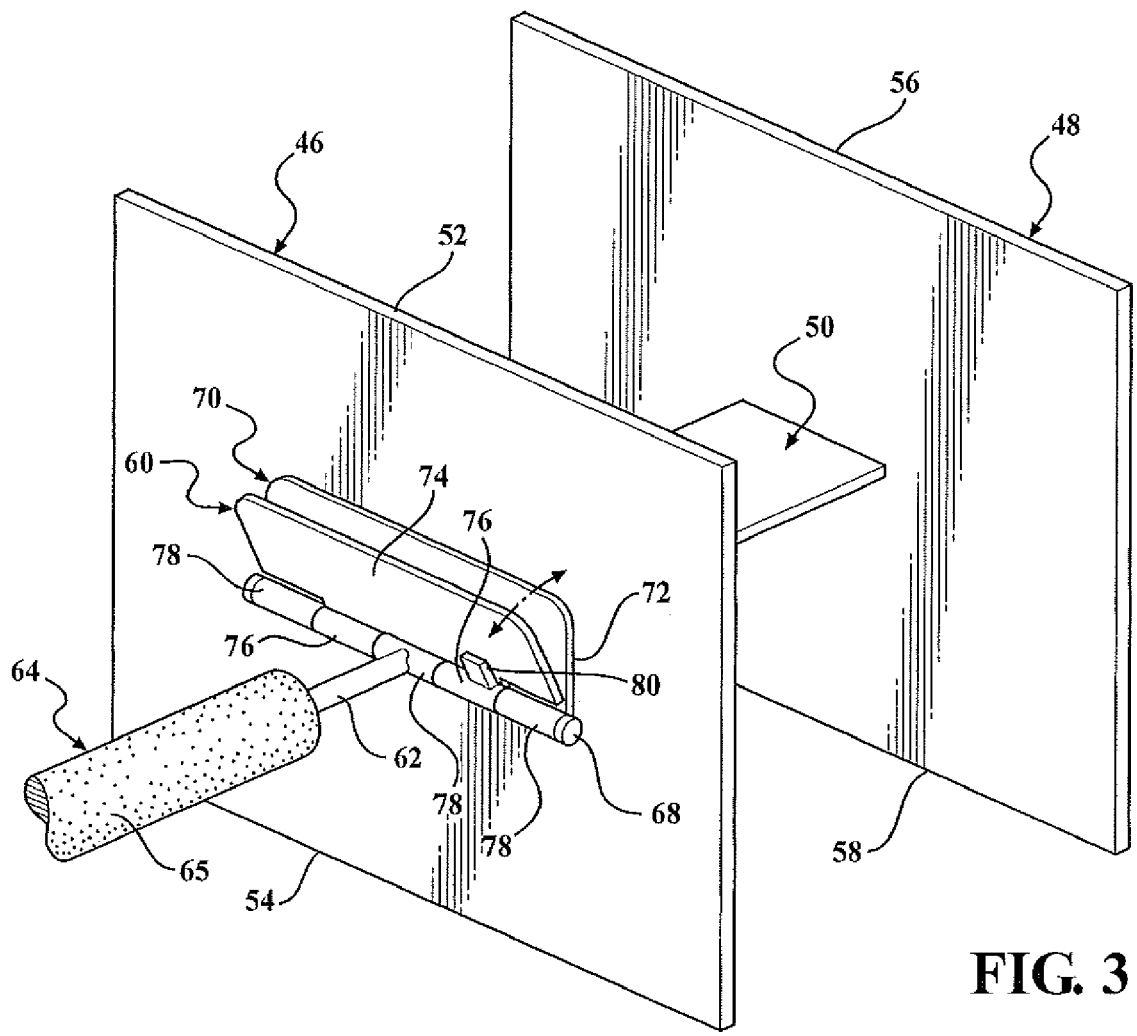
FIG. 3 is a further enlarged view of one portion of the headrest of claim 1 shown in an inverted position.
Figure 4:
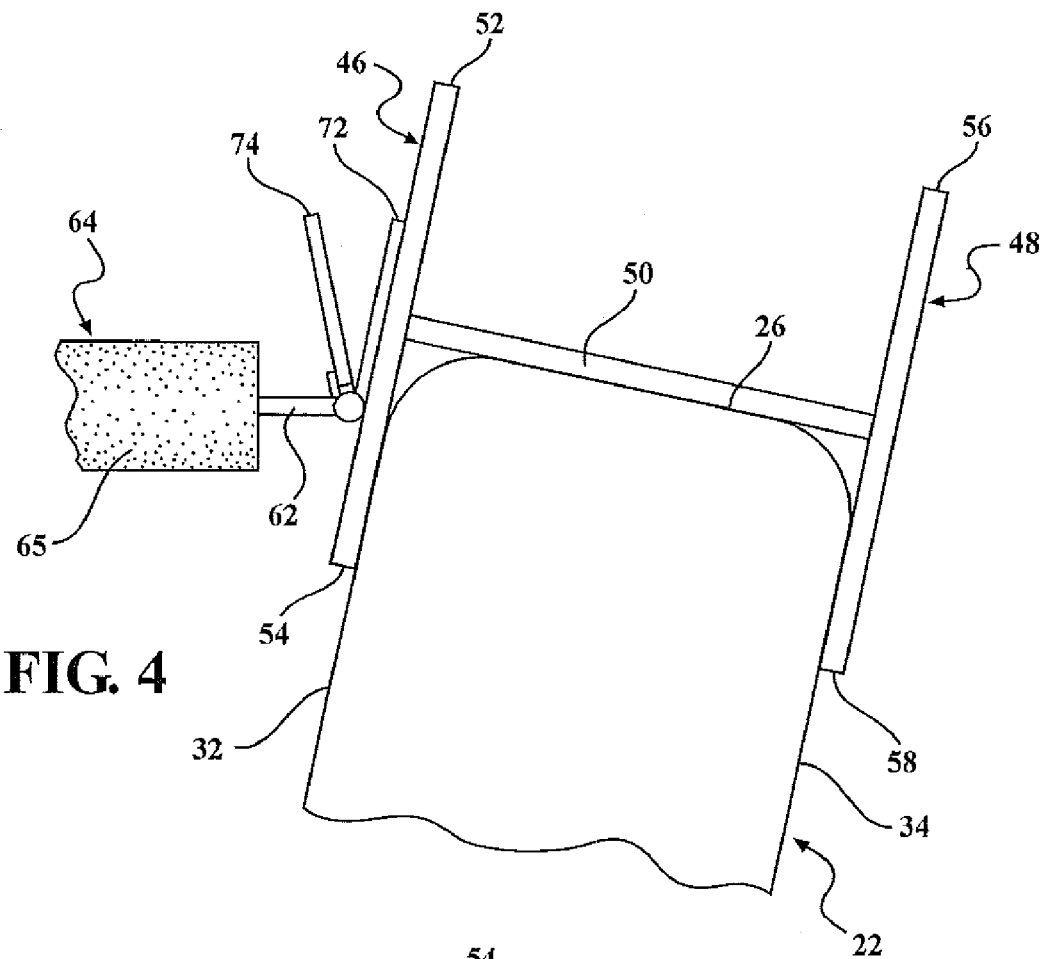
FIG. 4 is a side elevational view of one portion of the headrest shown in FIG. 1 deployed in a first employed position.
Figure 5:
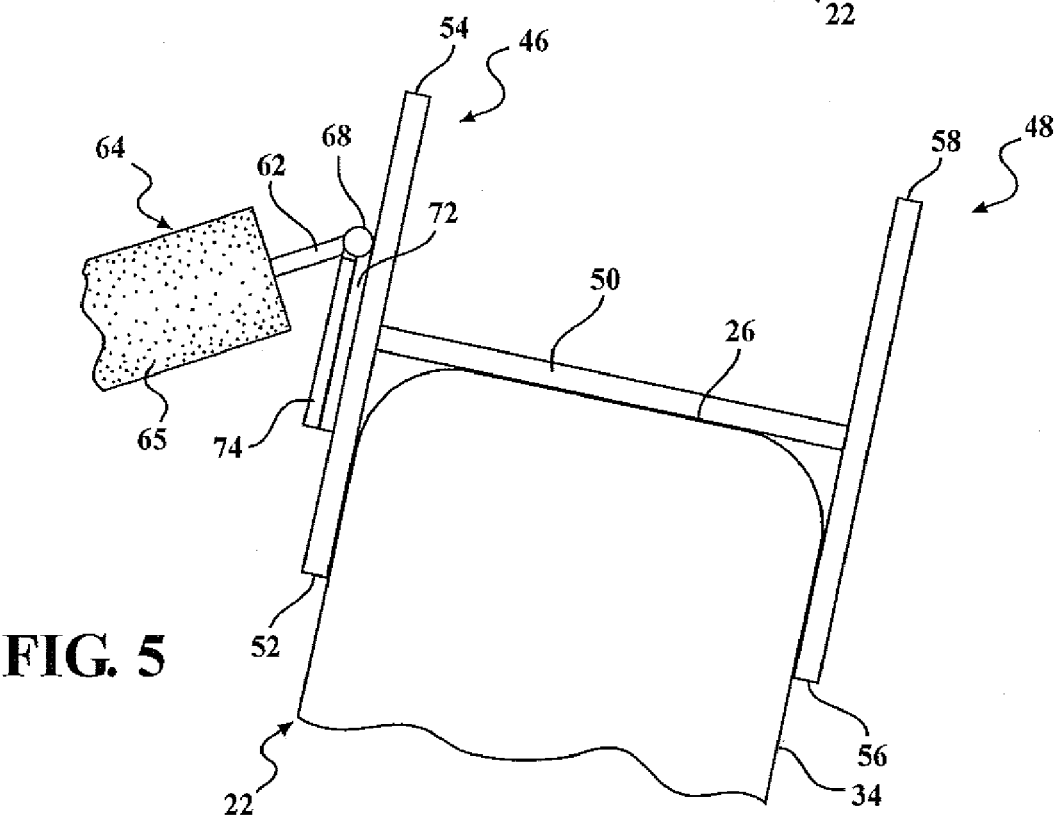
FIG. 5 is a side elevational view of one portion of the headrest shown in FIG. 1 deployed in a second employed position.

As shown more clearly in FIGS. 3-5, the upper edges 52 and 56 of the front and rear plates 46 and 48 extend above the strap 50 on the top edge 26 of the seat back 22. In the illustrated mounting position, shown in FIG. 4, the lower edges 54 and 58 of the front and rear plates 46 and 48 extend below the top edge 26 of the seat back 22.

A cushion connector 60 is affixed to the front plate 46 of each mounting member 42 and 44. In one aspect, the cushion connector 60 includes a wire rod 62, formed of plastic, metal, etc., which extends into or is otherwise affixed to one end of a cushion 64.

A hinge 70 is formed as part of the cushion connector 60. The hinge 70 includes first and second hinge portions or leaves 72 and 74. The first hinge portion or leaf 72 is fixedly attached by adhesive, integral molding fasteners to the front plate 46, etc. It will be understood that the first hinge leaf 72 may also constitute part of the front plate 46 itself. As is conventional, the first hinge leaf 72 includes a plurality of cylindrical, hollow spaced sleeves 76 adapted for receiving a hinge pin 68.

The second hinge leaf 74 also includes a plurality of cylindrical sleeves 78 which are linearly spaced apart and intermeshed with the sleeves 76 on the first hinge leaf 72 for receiving the pivot pin 68 therethrough and forming a pivot axis which extends in a substantially horizontal orientation when the headrest 40 is mounted over the top edge 26 of the seat back 22.

In this aspect, as shown in FIG. 3, the rod 62 is fixedly attached to one of the cylindrical sleeves 78 on the second hinge leaf 74, such as the central most sleeve 78. This causes the rod 62 to pivot with movement of the second hinge leaf 74 as described hereafter.

A stop 80, shown in FIG. 3, is fixed at one end to the second hinge leaf 74 and extends to an opposite free end adapted to abut one of the cylindrical sleeves 76 on the first hinge leaf 72 to limit the open pivotal movement of the second hinge leaf 74 with respect to the first hinge leaf 72 to a predetermined angle as shown in FIG. 3.

FIG. 3 depicts a first mounting position of the headrest 40 on the seat back 22. In this position of the headrest 40, the second hinge leaf 74 will pivot by gravity and the weight of the cushion 64 to the angularly open position angularly spaced from the first hinge leaf 72. This causes the rod 62 to orient the cushion 64 in a substantially horizontal position as shown in FIGS. 1 and 4 with respect to the seat back 22 and the seat bottom 24. This position of the cushion 64 would be suitable for adults or older children.

Figure 2:
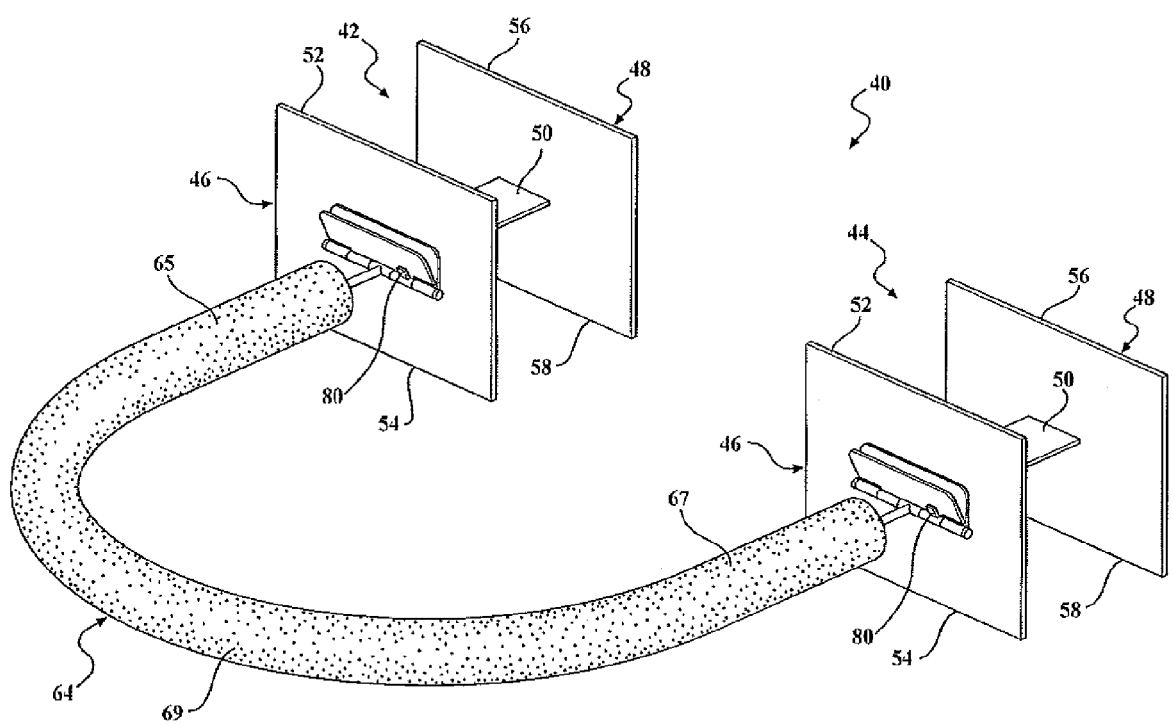
FIG. 2 is an enlarged perspective view of the head rest shown in FIG. 1.

For smaller height individuals, such as children the headrest 40 can be inverted 180° from the mounting position shown in FIGS. 1 and 2 by flipping the mounting members 42 and 44 end over end until the mounting member 44 is in the prior position of the mounting member 42 on the seat back 22 as shown in FIG. 5. When the mounting members 42 and 44 are reengaged with the top edge 26 of the seat back 22, the weight of the cushion 64 will cause a second hinge leaf 74 to pivot about the pivot pin 68 until it is disposed in close abutment or engagement with the first hinge leaf 72. This collapsing movement of the hinge 70 causes the rod 62 and the cushions 64 to pivot in a downward direction relative to the seat back 22 to a smaller acute angle with respect to the seat back 22. This lowers the sides and front of the portions of the cushion 64 for shorter height individuals.

It should be noted that the cushion 64 can take a variety of shapes, such as the general by U-shape shown in FIGS. 1 and 2. The U-shaped cushion 64 defines a smoothly curved semi-circle including opposed side portions 65 and 67 and a central, front end portion 69. The free ends of the side portions 65 and 67 are connected to the rods 62 on the mounting members 42 and 44 as shown in FIGS. 1 and 2. Alternately other shapes are possible for the cushion 64, such as a D shape, oval, triangular, etc.

Figure 6:
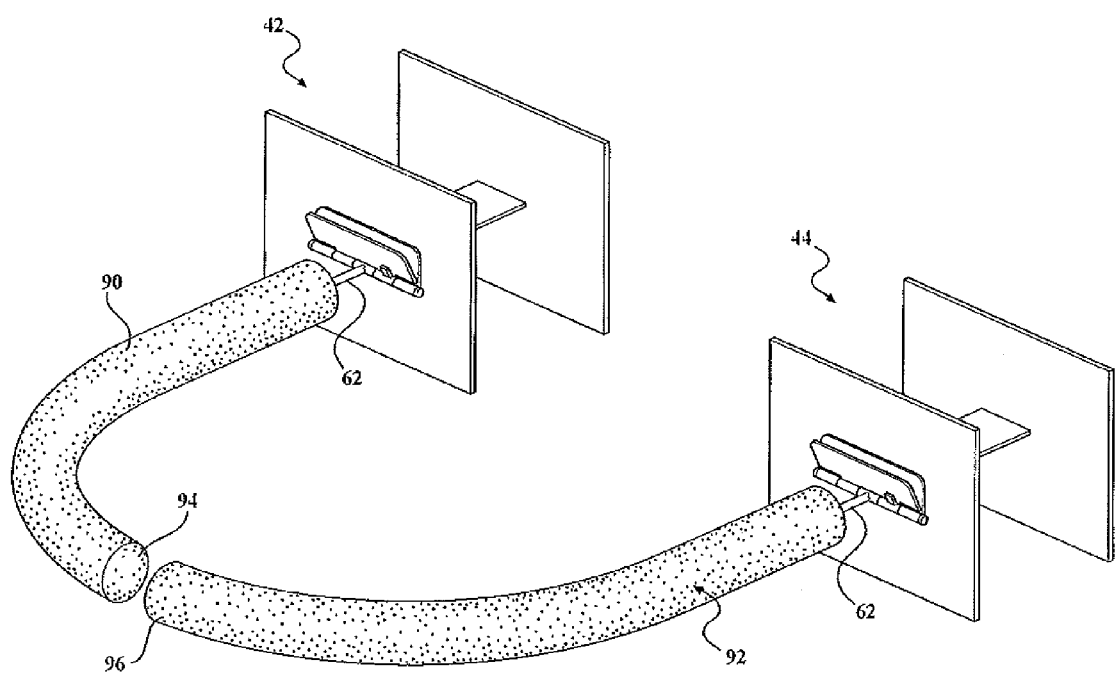
FIG. 6 is a modification of the headrest shown in FIG. 1.

Alternately, as shown in FIG. 6, individual cushions 90 and 92 may be coupled to each rod 62 on each of the mounting members 42 and 44. The cushions 90 and 92 may also take a variety of shapes and lengths. For example, the cushions 90 and 92 are illustrated in FIG. 6, by exampled, as having a general J-shape. Free ends 94 and 96 of the cushions 90 and 92 may be disposed in close proximity to or even in contact with each other to form a chin support for a person in the seat.

Alternately, the cushion 90 and 92 may have generally planar or slightly curved side members, without a central portion, so as to be capable of supporting only the sides of a user's head.

The cushions 64, 90, or 92 may be formed in any conventional manner, depending upon the construction and use of the seat. Foam or other soft, compliant materials may be used for the entire cushion or an internal core of the cushion. Decorative outer covers, formed of leather, plastic, fabric, and complimentary to materials used in conventional vehicle, airplane, train or home seats, maybe employed.

Figure 7A:
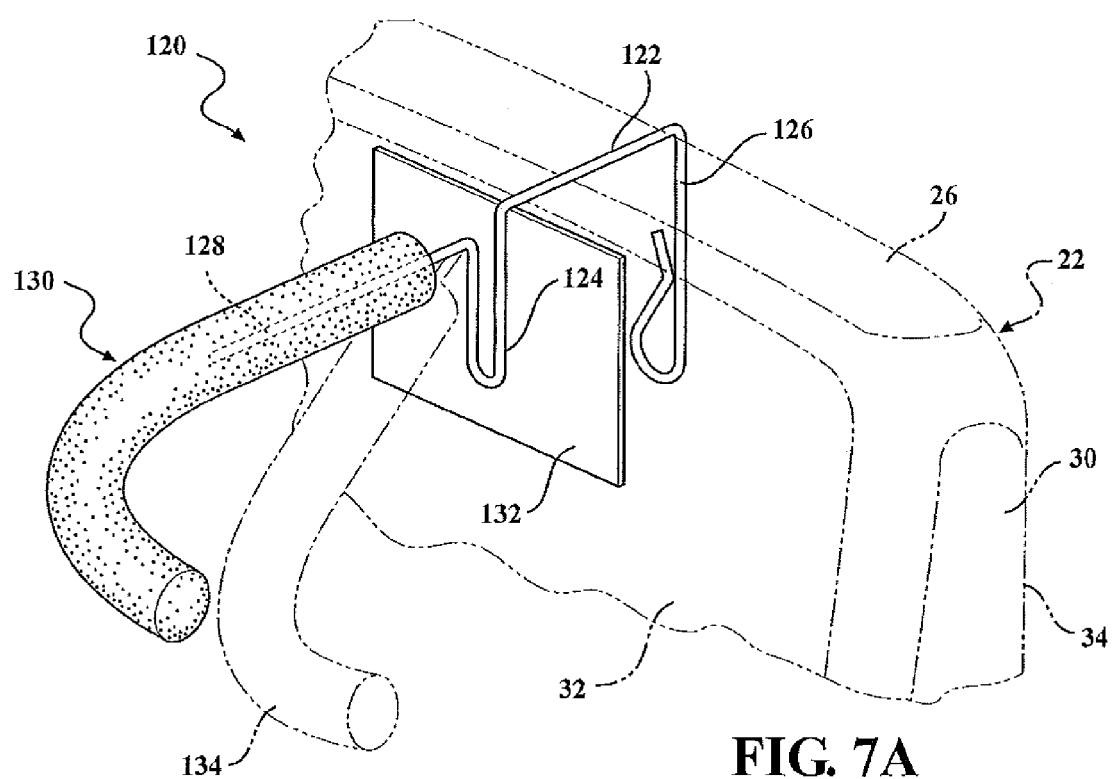
FIG. 7A is a perspective view of another aspect of a headrest.

Referring now to FIG. 7A, there is depicted another aspect of a headrest 120. In this aspect, the mounting member and the cushion connector are formed of a single pre-shaped or bent rod 122. The rod 122 can be made of any suitable material, such as moldable plastic as well as plastic covered metal, etc. The rod 122 is bent or pre-shaped into a mounting portion including first and second mounting legs 124 and 126 configured to respectively engage the front surface 32 and the rear surface 34 of the seat back 22. Each mounting leg 124 and 126 is formed of two adjacent bent portions of the rod 122 for stability and adjustability. An end portion 128 of the rod 122 is disposed within a cushion 130 for supporting the cushion 130 on the mounting rod 122.

As in previous aspects of the present headrest, the cushion 130 may take a variety of shapes, including straight, slightly curved, or the J-shape shown by way of example in FIG. 7A.

An enlarged pad or plate 132 is fixed to the front mounting leg 124 to provide an enlarged surface area for securely supporting the headrest 122 on the seat back 22. Depending on the materials used to form the rod 122 and the pad 132, welding, adhesive, fasteners, or other joining techniques may be employed to fixedly join the pad 132 to the front mounting leg 124.

Where the rod 122 is made of a flexible metal, the front end portion 124 of the rod 120 due to angled, two part form of the front mounting leg 122 maybe easily bent in a downward position to lower the angle of the cushion 130 relative to the seat back 22 as by reference number 24 shown in phantom in FIG. 7A. This enables the position if the cushion 130 to be adjusted to suit the height of the user of the seat.

Figure 7B:
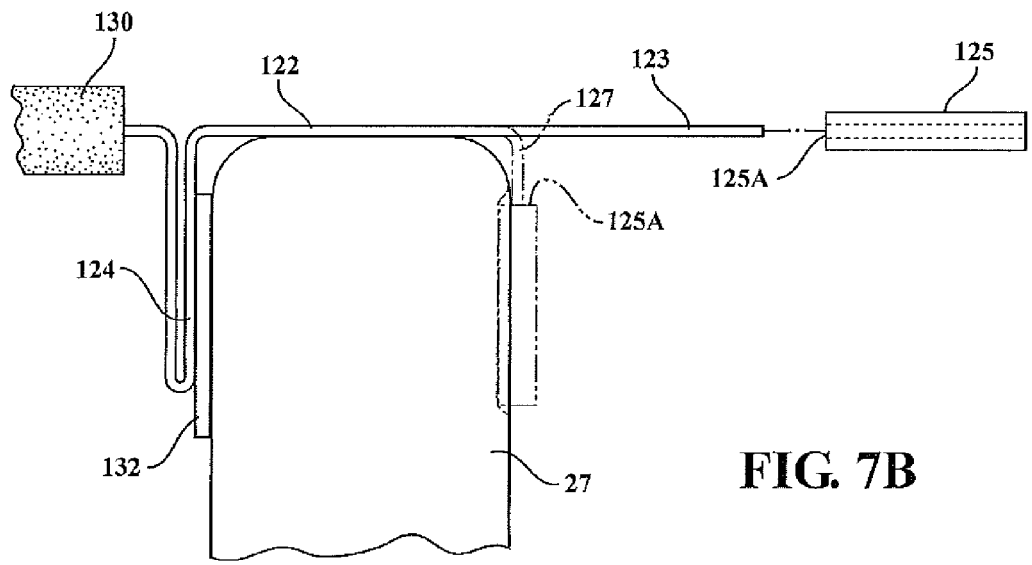
FIG. 7B is a side elevational view of a modification to the headrest shown in FIG. 7A.

Another aspect of the wire connector 122 is shown in FIG. 7B. In this aspect of the headrest, the second leg 126 shown in FIG. 7A is replaced by an initially shaped straight portion with the connector portion 122. A form 125 having an internal bore size to slidably fit the form over the end of 123 of the rod 122 is provided with an edge 125A.

In use, with the end portion 123 of the rod 122 extending perpendicularly away from the rear surface of the seat back 27, which has a smaller thickness than the seat back 22 shown in FIG. 7A, the form 125 is slid over the end portion 123 of the rod 122 until the end 125A of the form 125 abuts the rear edge of the seat back 27. The form 125 is then used to bend the free end 123 of the rod 122 in a downward position until the form and/or the free end 123 of the rod 122 is bent at a downward extending angle relative to the connector portion of the rod 122 a lane over the top edge of the seat back 27 to snugly conform the rod 122 to the shape and thickness of the seat back 127.

Figure 7C:
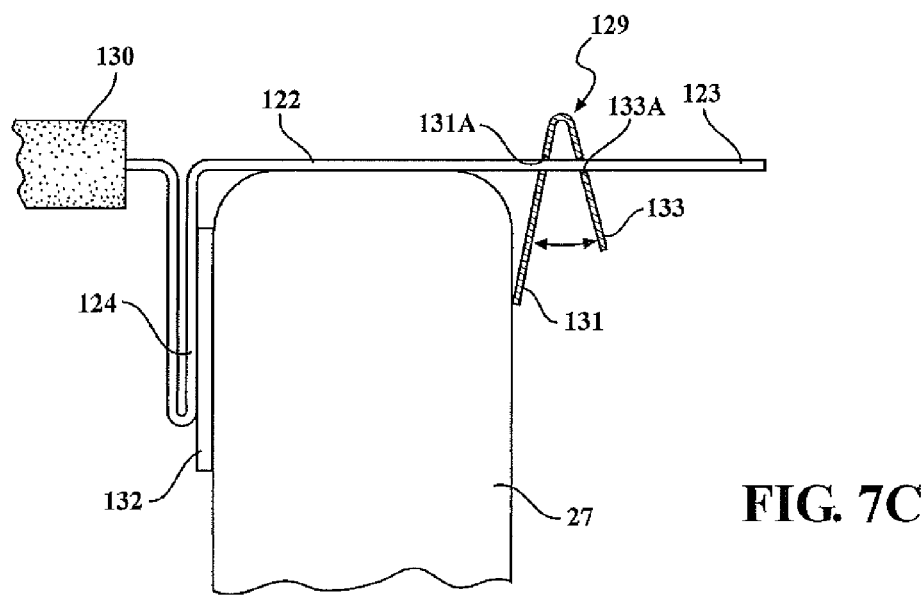
FIG. 7C is a side elevational view of another medication to the headrest shown in FIG. 7A.

Another modification to the wire connector 122 is shown in FIG. 7C. In this aspect of the headrest, the rod 122 also has the straight rearward extending portion 123. Rather than bending the rod 122 around the top edge of the seat back 27, a clip 129 is provided. The clip 129 is formed of a spring material, such as a spring steel or plastic and has a V-shape formed with first and second angularly disposed legs 131 and 132. Coaxially aligned apertures 131A and 133A are respectively formed in the legs 131 and 133 and are sized to fit over the free end 123 of the rod 122.

In use, after the rod 122 is mounted over the top edge of the seat back 127, the apertures 131A and 133 of the clip 129 are slid over the free end of the rod 122 by bending the legs 131 and 133 of the clip 129 together. This coaxially aligns the apertures 131A and 133A to allow easy sliding insertion of the clip 129 over the free end 123 of the rod 122. The clip 129 is slid along the length of the free end 123 until the leg 131 contacts the rear surface of the seat back 27. The force holding the end of the legs 131 and 133 is then released which the causes the legs 131 and 133 to spring outward to the position shown in FIG. 7C. This moves the apertures 131A and 133A out of coaxially alignment and brings edges of the legs 131 and 133 surrounding the apertures 131A and 133A into friction contact with the end portion 123 of the rod 122 to forcibly hold the clip 129 on the rod and thereby the entire mounting member and cushion 130 on the seat back 27.

This arrangement allows easy adaptability of the mounting member to any thickness seat back. The free end 123 extending rearward of the clip 129 can be covered a cushion, such as the form 125 shown in FIG. 7B. Alternately, user of the mounting member with the clip 129 can be reserved for seat backs in the rear seat of a vehicle, such as the rear most seat of a mini van or SUV or the rear seat of a vehicle having only front and rear seats.

Figure 8:
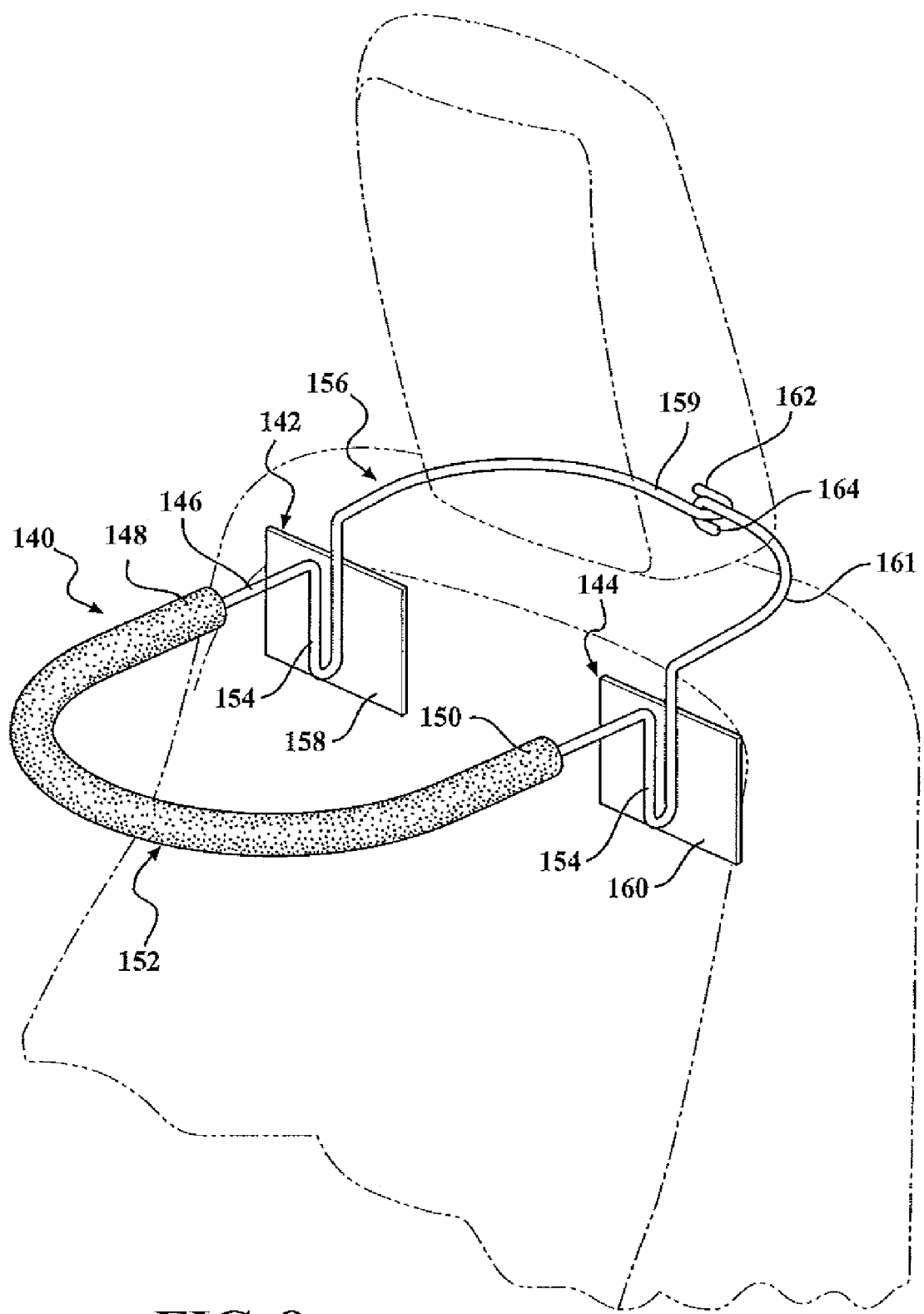
FIG. 8 is a perspective view of another aspect of a headrest.

FIG. 8 depicts another aspect of a headrest 140 which can be considered a modification of the aspect shown in FIG. 7A. The headrest 140 shown in FIG. 8 includes a first seat mount member 142 and a second seat mount member 144. The seat mount members 142 and 144 are substantially identical in that each includes an end portion 146 engagable with one end 148 or 150 of a cushion 152 and a mounting leg portion 154 formed of a U-shaped bend in a rod 156. An enlarged pad 158 and 160 is coupled to the mounting leg 154 in each mounting member 142 and 144 for engagement with the front surface 32 of a seat back 22.

The rod 156 is formed as a continuous member with freely movable second end portions 159 and 161 which are formed with interconnecting means 162 and 164 in the form of interlocking hooks or loops. This arrangement allows the enlarged pads 158 and 160 to be engaged with the front surface 32 of the seat back 22 and then the free ends 159 and 160 of the rod 156 looped around the head restraint or upper portion of the seat back 22 and interlocked to secure the headrest 142 on the seat 20.

If the rod 152 is formed of a flexible material, such a flexible metal, not only can the angle of the end portions 146 of the rod 156 be changed to vary the angle of the cushion 152 relative to the seat back 22, but the free end portions 159 and 160 of the rod 156 may also be bent to any desired shape to fit the headrest 142 securely about the upper portion of any size or shape seat back 22.

Figure 9:
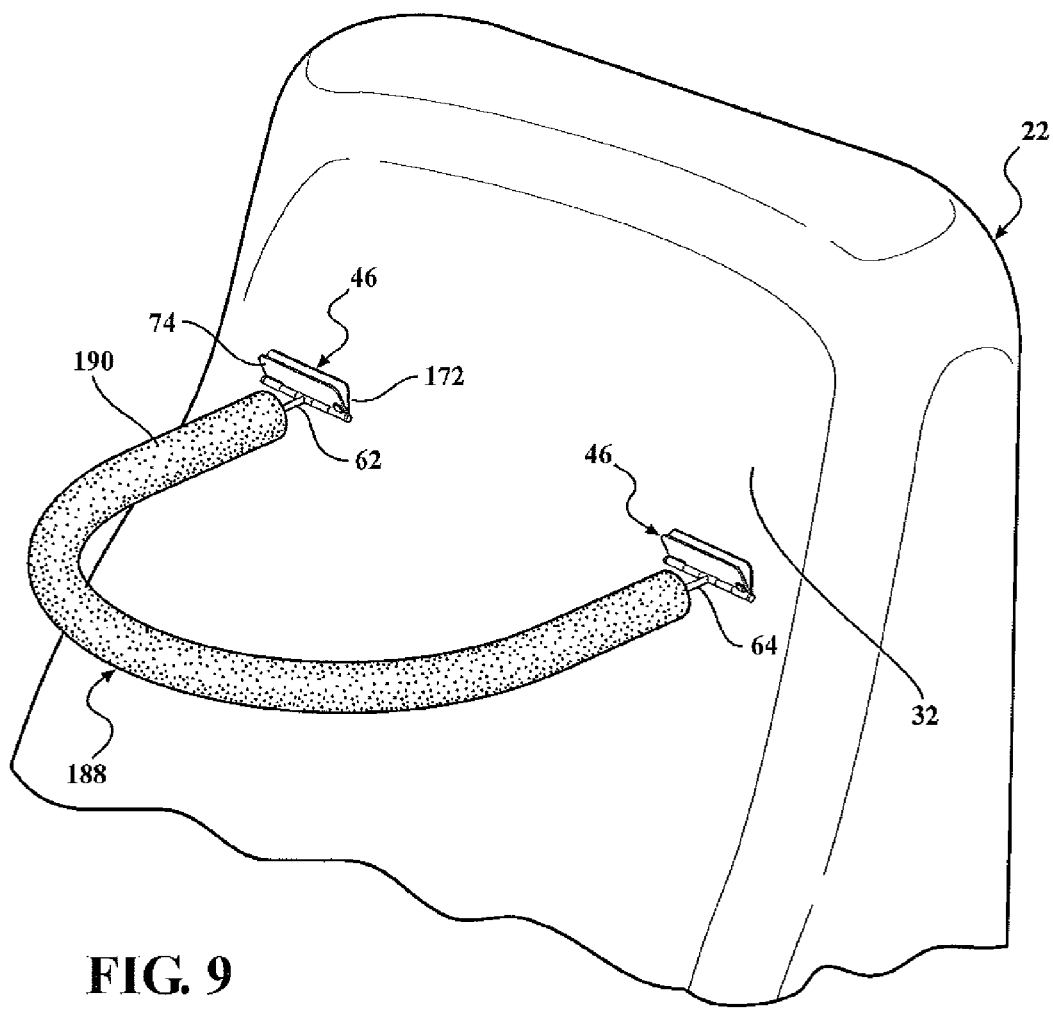
FIG. 9 is a perspective view of another aspect of a headrest.
Figure 10:
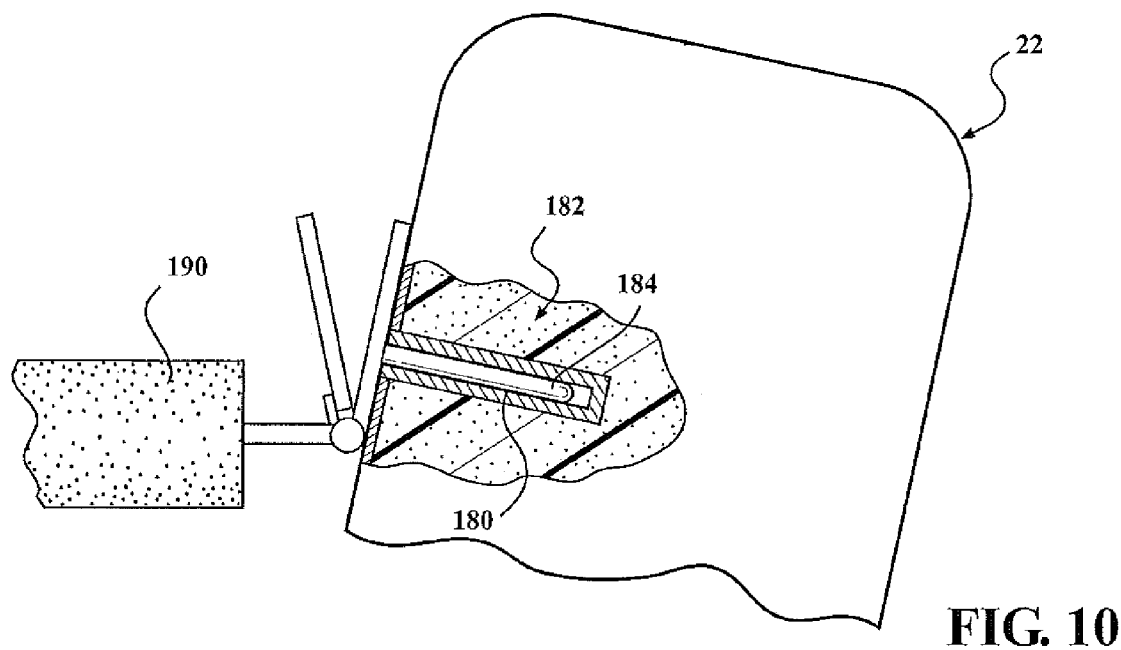
FIG. 10 is a side elevational view of a headrest shown in FIG. 9 depicted in a first deployed position.
Figure 11:
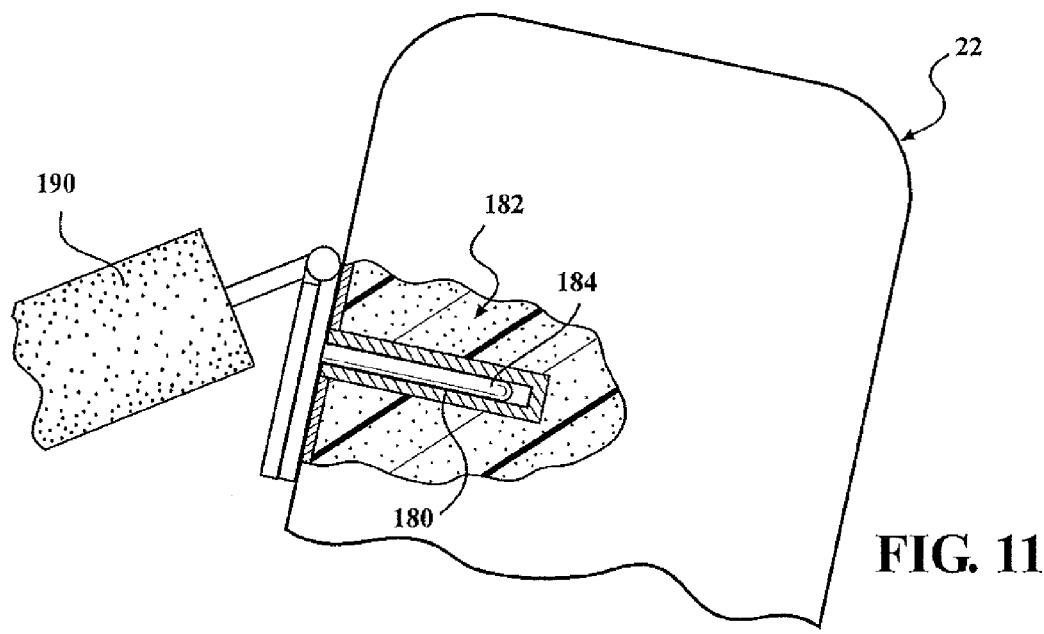
FIG. 11 is a side elevational view of a headrest shown in FIG. 9 depicted in a second deployed position.

Another aspect of a headrest is shown in FIGS. 9-11 in which the headrest is integrally coupled to the seat back 22.

In this aspect, the seat back 22 is formed with a hollow bore 180 which maybe contained within a rigid cylinder 182 fixedly mounted in the upper portion of the seat back. The bore 180 in the cylinder 182 has an open end through the front surface 32 of the seat back 22.

The hinge members 46 and rods 62 and 64 of the headrest 40 shown in FIG. 2 are also employed in this aspect of the headrest. An additional rod 184 extends from a first hinge leaf 72 and is removably insertable into the bore 180 in the cylinder 182 mounted in the seat back 22. The rods 62 and 64 support a cushion 190. The cushion 190 is shown by example only as being a continuous semi-circular cushion extending between each of the rods 62 and 64. It will be understood that each rod 62 and 64 may support a separate cushion, such as the straight or J-shaped cushions shown in FIG. 6.

When the rods 184 coupled to the hinge members 46 are inserted into the bores 180 in the seat back 22 in a first orientation, shown in FIG. 10, the second hinge leaf 74 will pivot to an open position, angularly spaced from the first hinge leaf 72 to orient the cushion 190 in a substantially horizontal position relative to the seat back 22.

The rods 184 may be removed from the bores 180 in the seat back 22 and the entire head rest 188 inverted as shown in FIG. 11 before the rods 184 are reinserted into the bores 180 of the seat back 22. In this orientation, the second hinge leaf 74 pivots into close proximity to or in contact with the first hinge leaf 72 thereby dropping the cushion 190 to a smaller acute angle relative to the seat back 22 then when the mounting members are in the opposite position shown in FIG. 10.

Figure 12:
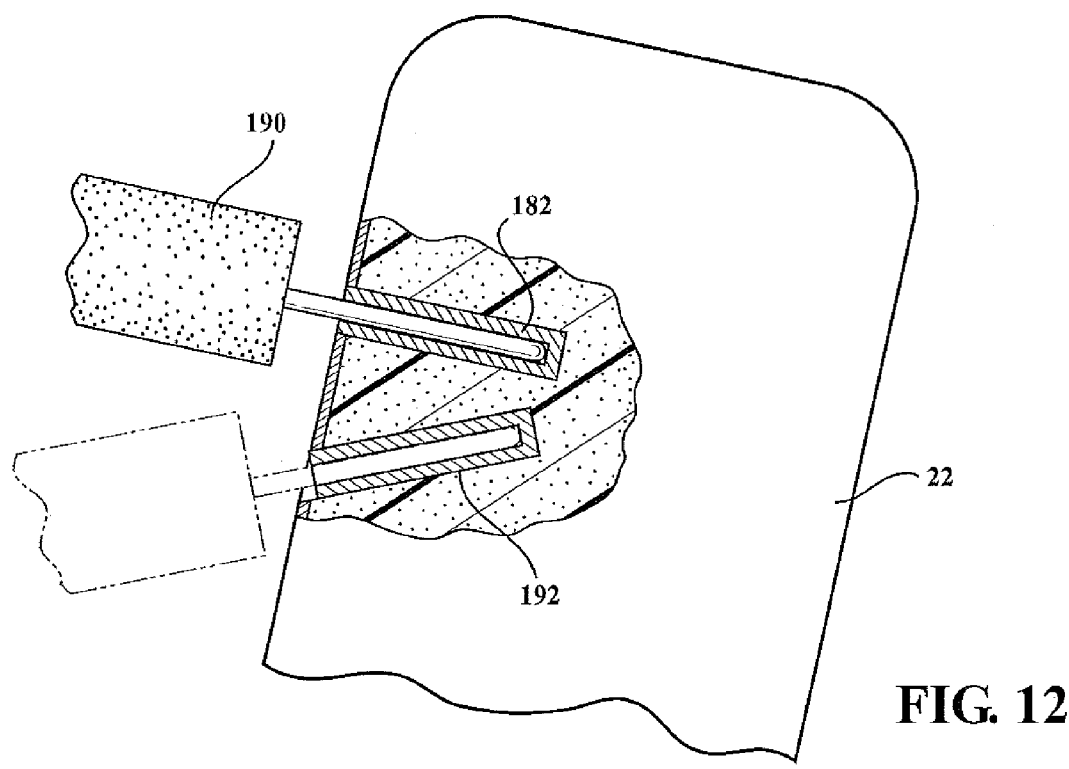
FIG. 12 is another aspect of a headrest.

The varying angular position of the cushion 190 may also be achieved by employing two pairs of cylindrical members 182 and 192, as shown in FIG. 12, on one side or both sides of the upper portion of the seat back 22. The second cylindrical sleeve 192 is angled at a more downward angle then the generally horizontally disposed sleeve 182. The rods 62, which do not have the hinge members 46, may then be simply inserted into the bores in either cylindrical sleeve 182 or 192 to place the cushion 190 at the desired one of two angular positions relative to the seat back 22 to accommodate the height and size of the user of the seat.

Figure 14:
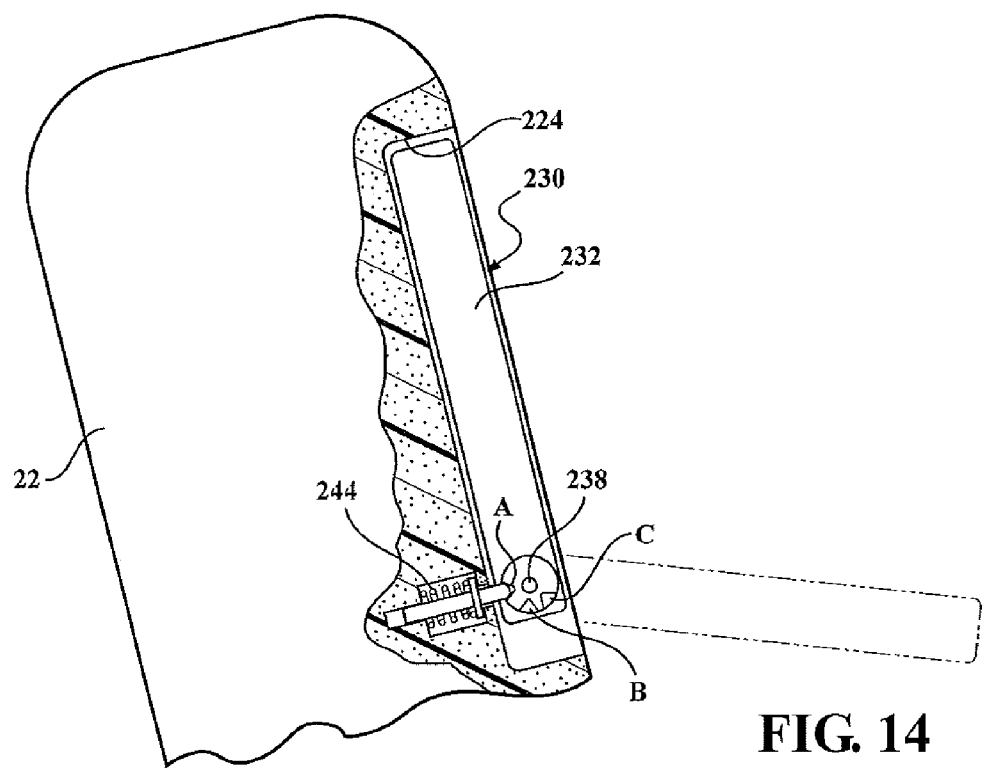
FIG. 14 is a cross-sectional view generally taken along lines 14-14 in FIG. 13.
Figure 13:
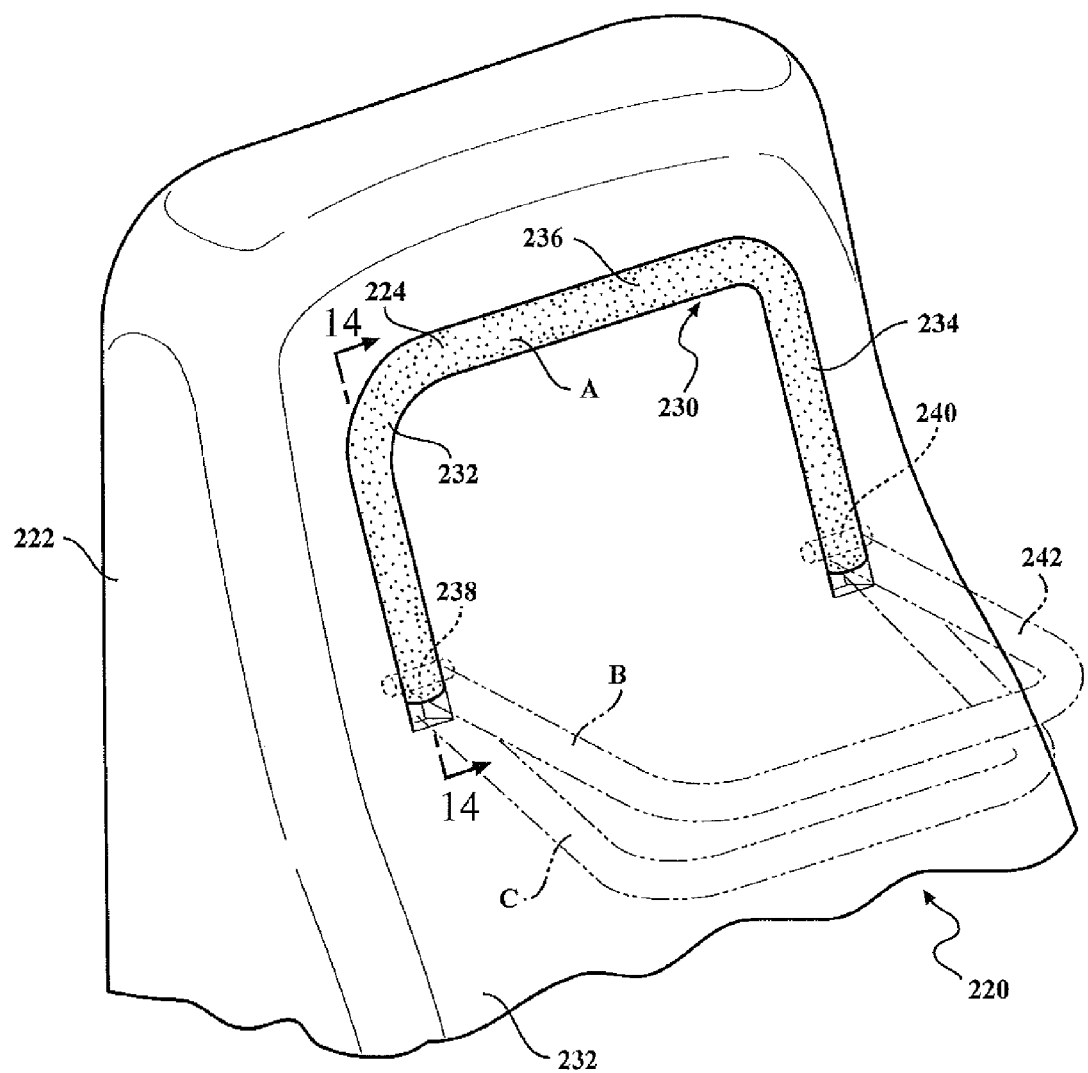
FIG. 13 is a perspective view of another aspect of a headrest.

Another aspect of a headrest is shown in FIGS. 13 and 14. In this aspect, a seat back 222 of a seat 220 has a recess 224 formed along the upper portion of the seat back 22 and extending inward into the seat back 222 from the front surface 232. The recess 224 may have an inverted U-shape to accommodate a continuous semicircular U-shaped cushion 230 shown by way of example in FIG. 13. In the case of only a single side cushion or a pair of separate side cushions which are independently movable relative to other, the recess 224 would have a shape complimentary to the shape of the cushions employed in the headrest.

The cushion 230 is formed with a pair of opposed side arms 232 and 234 which interconnected at one end by an end segment 236. A pivot pin 238 and 240 is mounted in the end of each arm 232 and 234, respectively. A metal sleeve may be mounted in the end of each of the cushion arms 232 and 234 to provide an easily slidable connection to the pivot pins 238 and 240. The pins 238 and 240 are fixedly mounted within the internal structure of the seat back 22 and form co-axial pivot axes about which the entire cushion 230 can pivot.

The pivot connections provided by the pivot pins 238 and 240 on the arms 230 and 234 of the cushion 230 enable the cushion 230 to be pivoted from a first position, shown in solid in FIGS. 13 and 14 in which the cushion 230 is completely seated in the recess 224 in the seat back 222 thereby forming an integral part of the seat back 222. The cushion 230 can be easily pivoted by hand force from the retracted position shown in FIG. 13 to a first deployed position shown in phantom by reference number 242 in FIG. 13. Although this first deployed position 242 of the cushion 230 is shown as being substantially perpendicular to the seat back 22 or parallel to the seat bottom 224, it will be understood that the bottom edge of the recess 224 can be angled downward a greater amount to allow further pivoting movement of the cushion 230 below the horizontal to a more angled position relative to the seat back 232.

Alternately, an electric motor can be coupled to the side arms 232 or 234 and mounted in the seat back or seat bottom for automatically extending and retracting the cushion 230 through activation of a remotely located control switch.

In a modification to this design shown in FIGS. 13 and 14, a detent mechanism is mounted in the seat back 222 and the cushion 230 to provide discrete angular positioning of the cushion 230 in one of several distinct deployed positions. The detent mechanism includes a spring based pin 244 projecting from the seat back 222 into the recess 224. A cylindrical disc is mounted in each cushion arm end around the pivot pins 238 and 240 and carries a plurality of circumferentially spaced detent recesses labeled A, B, and C. When the cushion 230 is rotated so that the pin 244 engages detent recess A, the cushion 230 will be in the full retracted position within the recess 224. However, hand force on the cushion 230 can easily pull the cushion 230 from the recess 224 and rotate the cushion 230 until the pin 244 engages detent recess B. This defines the first angular deployed position of the cushion 230. Further downward force on the cushion 230 will cause the cushion 230 to rotate about the pivot pins 238 and 240 until the detent pin 244 engages the detent recess C to provide a lower angled deployed position C of the cushion 230.

Further, it is possible to connect extensible and retractable devices, such as electric motor driven linear rods or extensible and retractable fluid operated cylinders, to the pivot connections at the ends of the side arms 232 and 234 of the cushion 230. The extensible and retractable devices which are operated simultaneously from a vehicle occupant activated switch, similar to switches used to control the up and down movement of the vehicle windows, enable the entire cushion 230, after the cushion has been moved at least partially out of the recess in the seat back 232, to be elevated from the lowermost position shown in FIG. 13 to a more elevated or vertical spaced position so as to selectively position the entire cushion 230 at the desired height for the particular size occupant of the seat 220.

The extensible and retractable mechanisms are operated in a reverse manner to lower the pivot connections at each of the side arms 232 and 234 back to the lowermost position shown in FIG. 13 prior to pivotal movement of the cushion 230 in an upward direction into the recess in the seatback 232.

Referring now to FIGS. 15-18 there is depicted another aspect of a headrest 270. As with previous aspects of the present headrest, the headrest 270 includes a cushion 271 depicted has having a generally U-shape formed of a central end portion 272 which transitions into angularly disposed side cheek portions 274 and 276. The headrest 270 may alternately be in the form of a single side cheek which may have a linear shape, a slightly curved or arcuate shape, or a J-shape having a side cheek portion and a partial front end which may extend into close proximity or contact with the end of a mirror image J-shaped side check portion mounted in the seat back 220. A single J-shaped cushion may be employed all by itself on one lateral side of the seat back 220.

A recess 286 is formed in the seat back 220 opening from an open end at the front surface 232 of the seat back 220. The recess 286 has a depth suited for completely receiving the entire depth of the end portion 272 of the cushion 271 when the cushion 271 is in the fully retracted position.

Apertures 278 and 280 are formed on opposite sides of the back surface of the recess 286. The apertures 278 and 280 and open either into the interior of the seat back 220 or into the interior of receptacles 282 and 284, respectively, fixed within the interior of the seat back 220, generally within the cushion material, such as foam, for example, used to fill the interior of the seat back 220.

It will be understood that in a case of a headrest in the form of a single side cheek cushion, only one aperture 278 or 280 is formed in the seat back 220 adjacent either side edge of the seatback 232.

By way of example only, a slide mechanism is mounted in the seat back 220 in the form of one or multiple box members, with two box members 288 and 290 provided, by example, on each side of the headrest 270. The box members 288 may have any suitable cross-section, such as square, rectangular, circular, etc. Each box member 288 has a one or more first end flange 292 which extend laterally outward from the longitudinal center line of the box member 288 and opposed second flanges 294 which extend inward into the interior of the box member. The box member 288 has a hollow interior size for receiving the second box member 290 or, in the case of the use of only the single box member 288, the end of one of the side cushion portions 274 or 278 of the cushion 271. The box member 280 has a sidewall 296 which extends between the flanges 292 and 294.

The flanges 292 and 294 may comprise a pair of two laterally opposed flanges or a continuous or discontinuous series of multiple flanges in the case of a square cross-section box member 288 or 290. The function of the flanges 292 and 294 is to control the extension and retraction position of the box members 288 and 290 as described hereafter.

Figure 17:
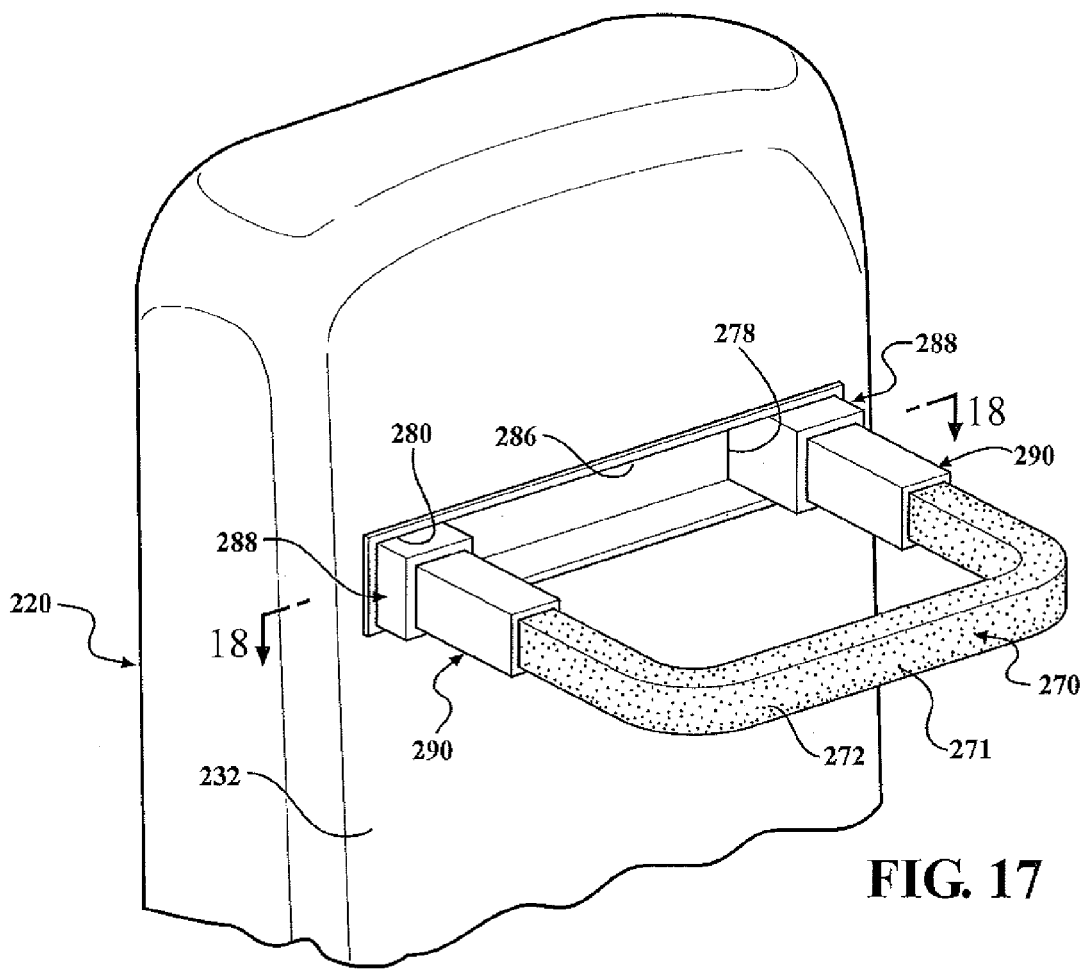
FIG. 17 is a perspective view of the headrest shown in FIG. 15 deployed in an extended, use position.
Figure 18:
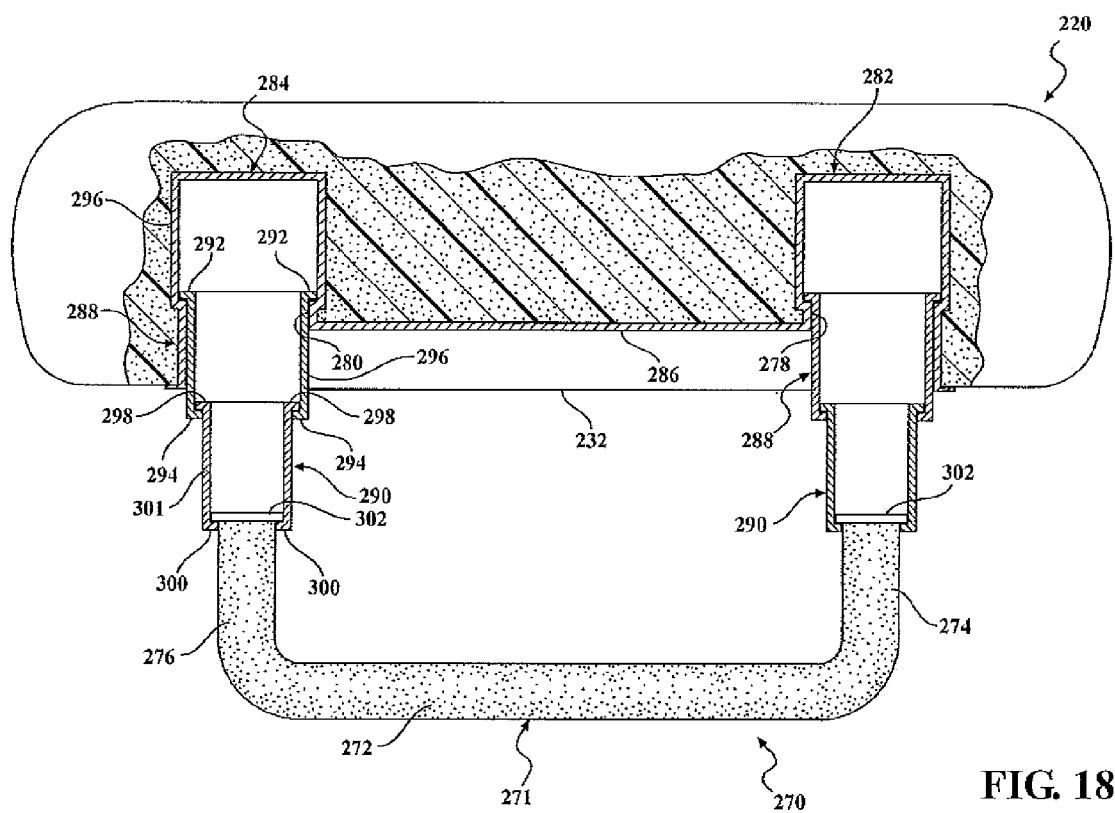
FIG. 18 is a cross-section view generally taken along line 18-18 and FIG. 17.

The second box member 290 has shape complimentary to the shape of the first box member 288, but with a smaller diameter or width dimension so that the flange or flanges 298 at a first end of the second box member 290 nest within the interior of the first box member 288 and are engageable with the second flanges 294 on the first box member 288 when the first and second box members 288 and 290 are pulled to their extended position as shown in FIGS. 17 and 18.

The second box member 290 includes a second flange or flanges 300 at an opposite end of a sidewall 301 which define an opening through which an enlarged end 302 of the side cushion 274 or 276 nests.

Figure 15:
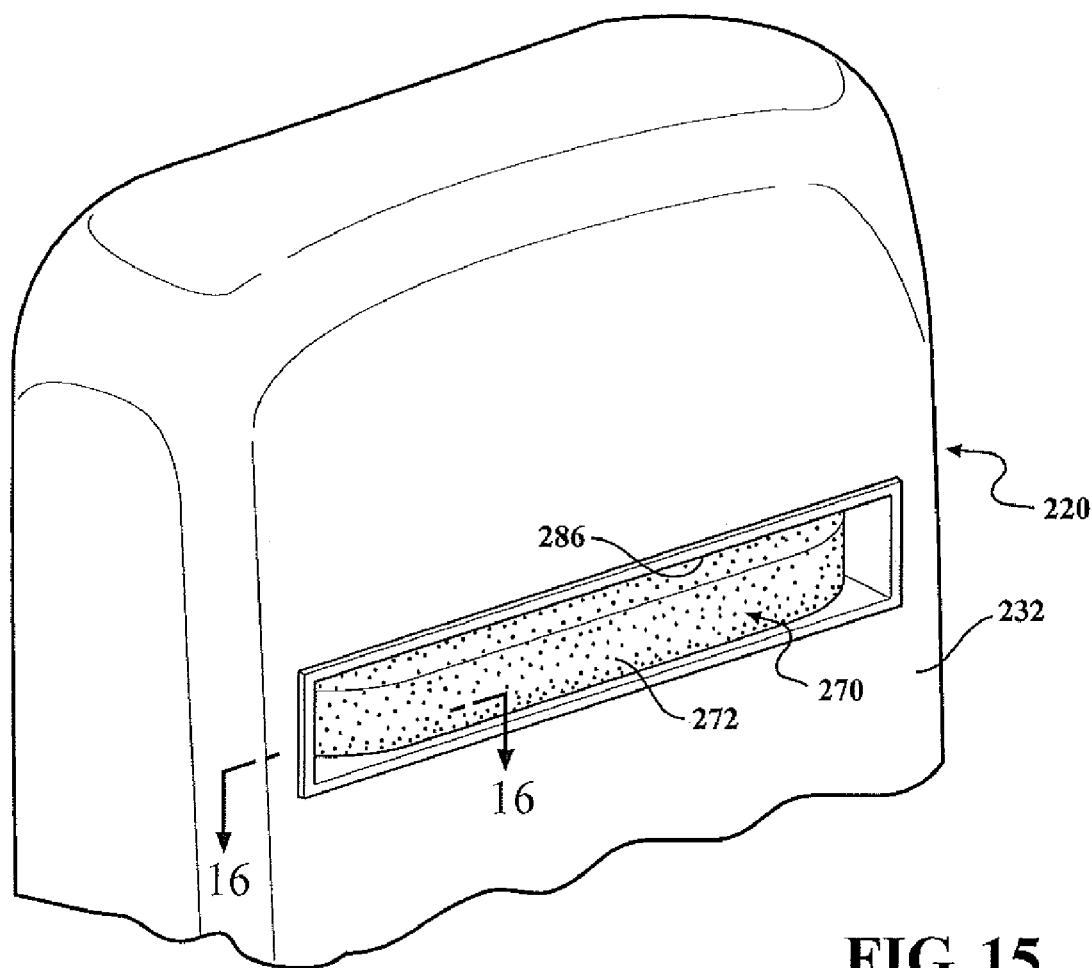
FIG. 15 is a perspective view of another aspect of a headrest depicted in a recessed, non-use position.

In use, the headrest 270 will assume to be in the retracted, non-use position shown in FIG. 15. In this position, the front end portion 272 of the cushion 271 fits substantially flush with the front surface 232 of the seatback 220 when the end portion 272 nests within the recess 286 opening from the front surface 232 of the seatback 220. This provides a substantially flush front surface 232 for the seat back 220 when the headrest 270 is not in use.

When use of the headrest 270 is desired, a user merely grasps the end portion 272 and pulls the end portion 272 outward away from the front surface 232 of the seat back 220. Although extension to the fully extended position shown in FIGS. 17 and 18 is the usual end position, it will be understood that the headrest 270 may be extended to any intermediate position to fit the size of the person seated in the seat.

Figure 16:
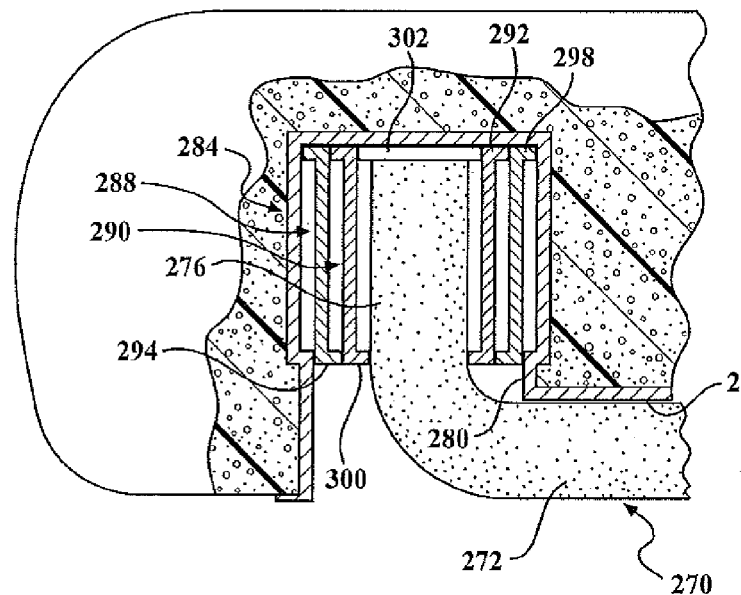
FIG. 16 is a cross-sectional view generally taken along line 16-16 in FIG. 15.

During the extension sliding motion, the flanges 292, 294, 298 and 300 of the box members 288 and 290 move from the nested position shown in FIG. 16. The initial outward force on the end portion 272 cause the side cushions 274 and 276 of the headrest 270 and their associated enlarged ends 302 to slide within the interior of the second box member 290 until the outer portions of the enlarged ends 302 engage the second flanges 300 on the second box member 290.

Continued outward force on the end portion 272 of the headrest 270 then causes the second box member 290 to slide through the interior of the first box member 288 from the nested, retracted position shown in FIG. 16 until the opposite end flanges 294 engage the second end flanges 298 of the first box 288. Continued extension movement then pulls the first box member 288 from the nested position shown in FIG. 16 to a fully extended position limited by engagement of the first end flanges 292 with a rigid plate or structure 310 formed within the seat back 220. This position, shown in FIGS. 17 and 18, defines the fully extended, use position of the headrest 270.

In the fully extended position shown in FIG. 17, the cushion 271 and the pairs of opposed box members 288 and 290 forms a opening in front of the front surface 232 of the seat back 270 suitable for receiving a least a portion of a user's head. The shape of the cushion 270 and the box members 288 and 290 surrounds the entire user's head so as to provide a cushion regardless of the position of the user's head.

When use of the headrest is no longer desired, the user simply exerts a pushing force on the end portion 272 of the cushion 271 which causes a reverse operation in which the ends 302 of the side cushions 274 and 276 slide through the interior of the second box member 290 until the laterally extending end portion 272 of the headrest 270 engages the flanges 300 on the second box member 290. This engagement and continued inward pushing force by the user, then causes the second box member 290 to move with the headrest 270 through the interior of the first box member 288 until the end portion 272 of the cushion 271 engages the second flanges 294 on the first box member 288. Continued inward pushing force then causes the first box member 288 to retract through the apertures 278 or 280 in the seatback 220. The inward pushing force is exerted on the headrest 270 until the front end portion 272 nests completely within the recess 286.

Referring now to FIGS. 19-23, there is depicted another aspect of a headrest 330 which is extensibly mounted within the seat back 220

As in previous aspects, the headrest 330 is shown as being in the form of a continuous U-shaped member only by way of example as having cushion 36 with a portion 327 and two side portions 328 and 329. The headrest 330 may also be in the form of a single side cheek cushion of linear, slightly curved or J-shaped, or two side cushions of like, minor image shape.

Figure 19:
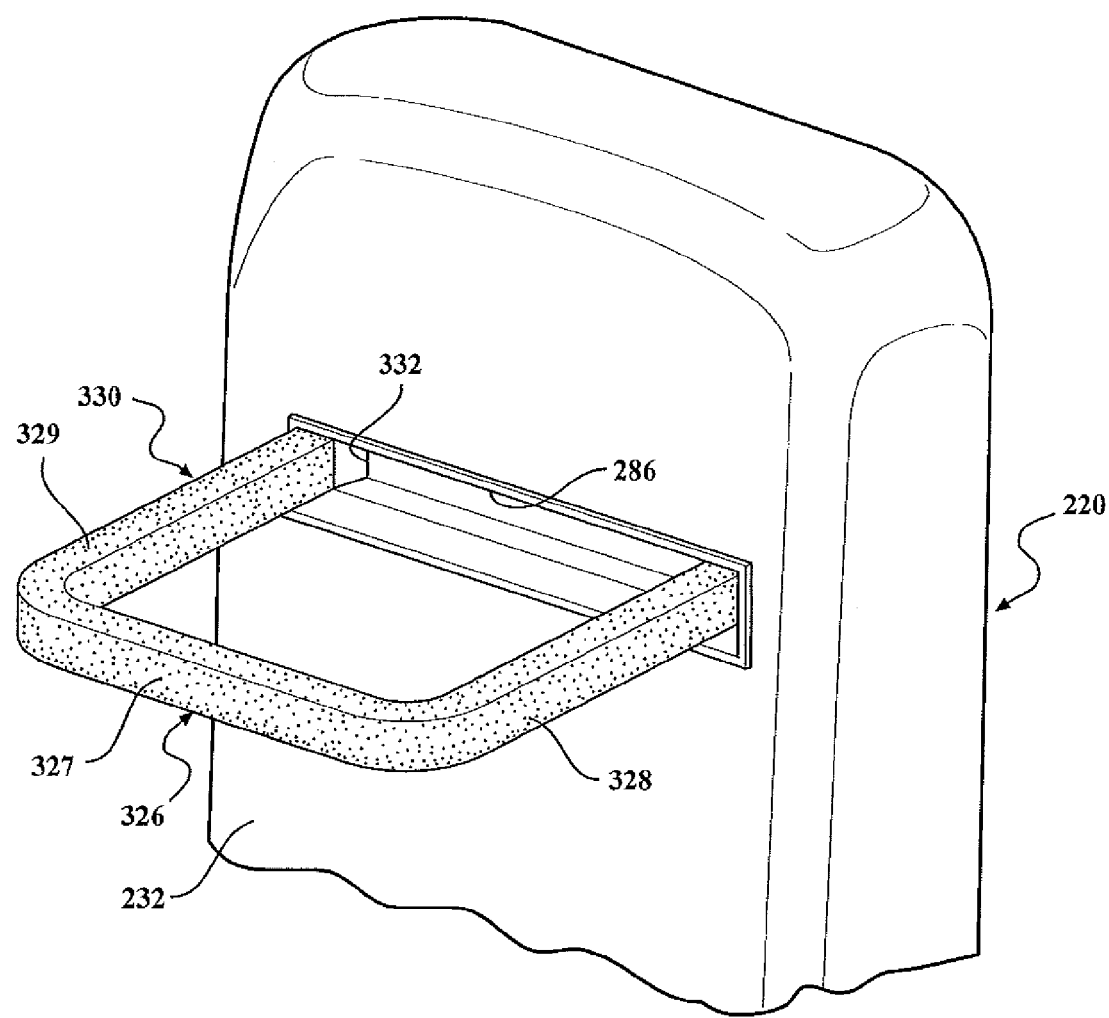
FIG. 19. is a perspective view showing another aspect of a headrest deployed in a partially extended use position.
Figure 20:
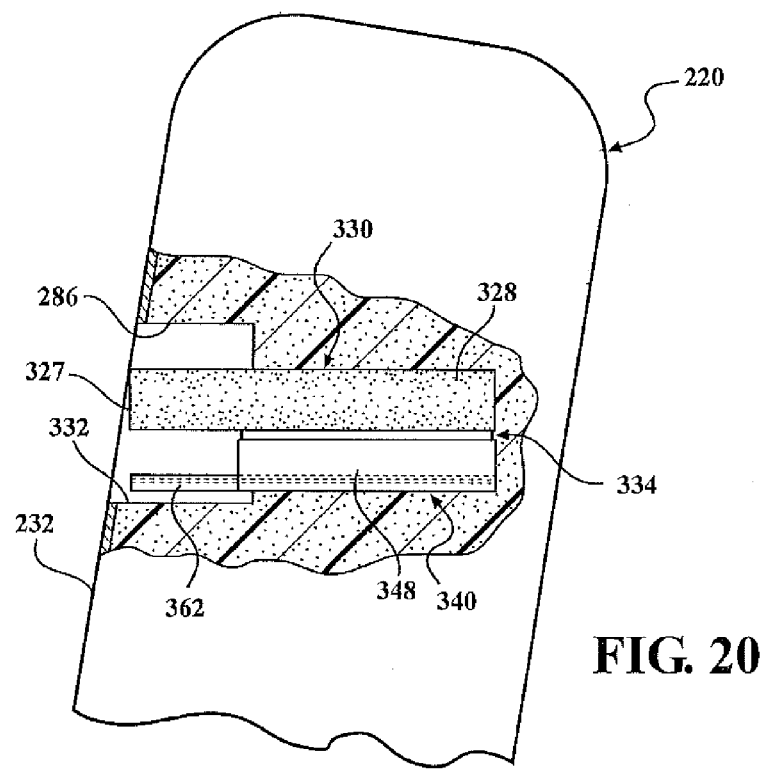
FIG. 20 is side cross-sectional view of the headrest shown in FIG. 19.

The seat back 220 has a configuration similar to that shown in FIGS. 15-18 and includes the recess 286 formed in the upper portion of the front surface 232 of the seat back 270. Opposed apertures 332, only one of which is shown in FIG. 19, are formed within the interior of the recess 286 and open to the interior of the seat back 220.

In this aspect, the headrest 330 extensibly and retractably moves on a slide mechanism denoted generally by reference number 340. The slide mechanism includes a lower track 342 and a slidably engaged upper slider 344 which is fixedly connected to and supports the end portion of the sides 328 and 329 of the cushion 326.

Figure 21:
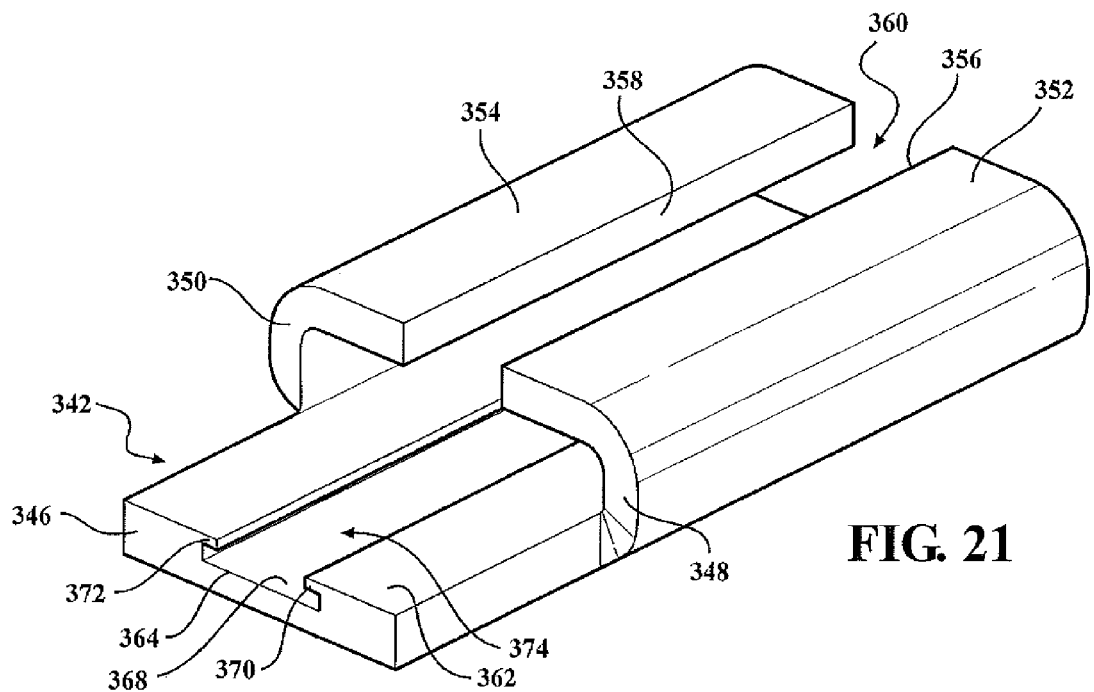
FIG. 21 is an enlarged, perspective view showing the lower track of the headrest depicted in FIG. 20.

As shown in detail in FIG. 21, the lower track 342, which may be formed of rigid, high strength plastic, metal or other suitable seat construction materials, has a bottom 346, a pair of opposed sides 348 and 350 and inward extending upper flanges 352 and 354 which are formed as an integral part or extension of the respective sides 348 and 350. The inner edges 356 and 358 of the upper flanges 352 and 354, respectively, are spaced apart to form a slot 360 which runs longitudinally along the entire length of the upper flanges 352 and 354.

The bottom 346 includes an extension 362 which projects from one end of the sides 348 and 350 and the inward extending flanges 352 and 354.

A recess 364 is formed substantially over the entire length of the bottom 346 of the lower track 342. The recess 364 is defined by a slot-like aperture 368 formed by upper inward extending flanges 370 and 372. The inner ends of the upper flanges 370 and 372 are spaced apart to define a slot 374 which runs along the length of the recess 364.

The upper slider 344 is slidably disposed within the interior of the sidewalls 348 and 350 and the inward extending flanges 352 and 354 of the lower track 342. A portion of the upper slider 380 projects through the slot 360 formed between the inner spaced edges 356 and 358 of the flanges 352 and 354.

Figure 22:
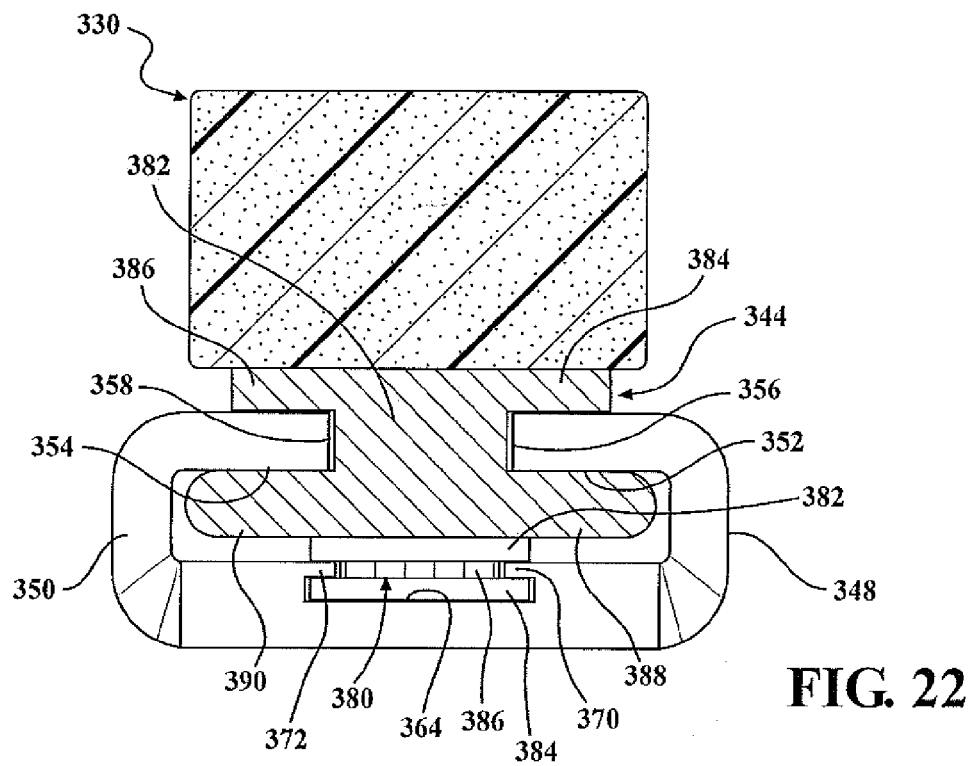
FIG. 22 is an end view of the slide mechanism for the headrest shown in FIG. 20.

As shown in FIG. 22, the upper slider 344 includes a central stem 382 from which projects a pair of longitudinally and oppositely extending upper flanges or lobes 384 and 386 and an opposed pair of longitudinally and oppositely or outwardly extending lower flanges or lobes 388 and 390. The lower flanges 388 and 390 slide within the opening extending above the bottom 346 and within the inner surface of the sides 348 and 350 and below the upper flanges 352 and 354 of the lower track 342 as shown in FIG. 22. A portion of the central stem 382 projects through the slot 360 formed between inner edges 356 and 358 of the upper flanges 352 and 354 to position the upper flanges 384 and 386 above the upper flanges 352 and 354 of the lower track 342.

The dimensions of the lower track 342 and the slider 344 are selected to provide a snug but freely movable fit. A friction fit may be provided to enable the upper slider 344 to be pulled out any desired distance relative to the lower track 346 and remain in a relatively stable position.

When the headrest 330 in the fully retracted position, the front end portion of the headrest 330 will be substantially disposed within the recess 286 and substantially flush with the front surface 232 of the seatback 220.

To use the headrest 330, the user grasps the end portion 327 and pulls outward away from the seat back 220. This outward movement causes the upper slider 344 to slide along the lower track 342 until the headrest 330 reaches the fully extended position shown in FIG. 19. It will be understood that if a friction fit is employed between the upper slider 344 and the lower track 342, the headrest 330 may be disposed in any intermediate position between the full retracted position and the fully extended position.

An internal stop, not shown, may be coupled between the upper slider 344 and the lower track 342 to limit sliding movement of the upper slider 344 in a forward direction relative to the lower track 342 to prevent the headrest 330 from being pulled completely out of the slide mechanism 340.

A reverse operation using an inward pushing force causes the headrest 330 to move to the fully retracted position within the recess 286 in the seat back 220.

Figure 23:
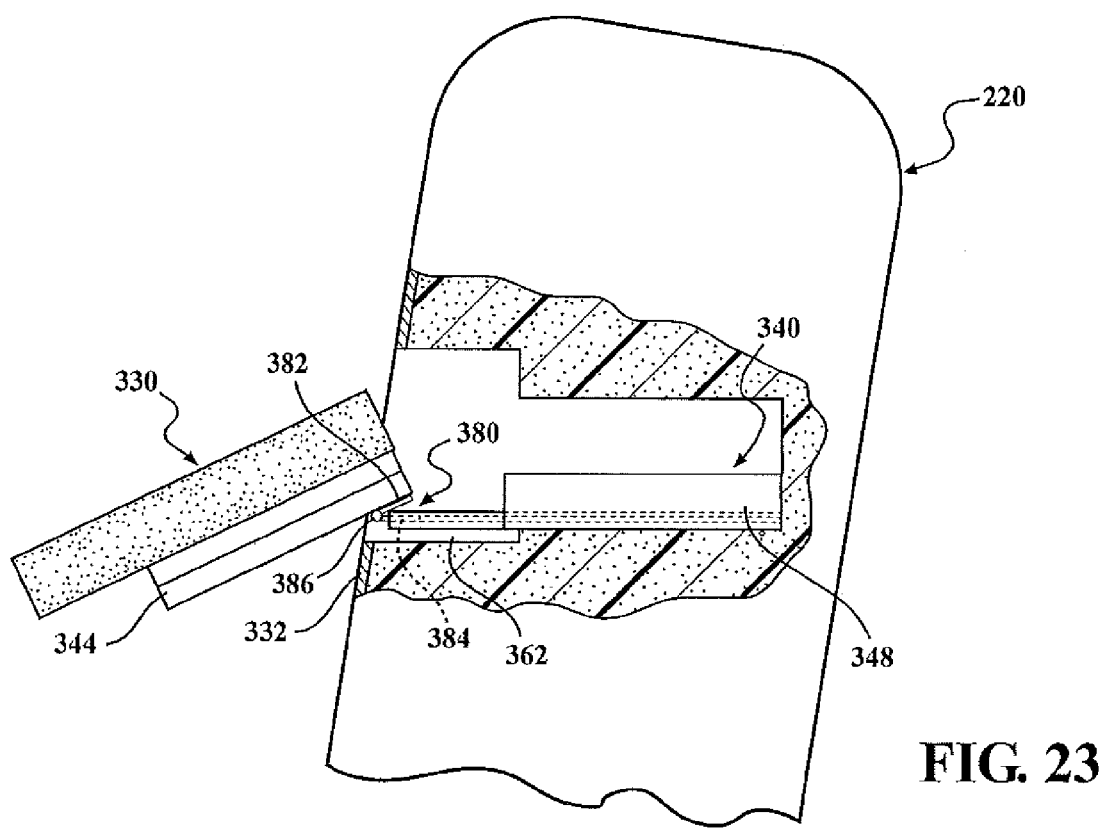
FIG. 23 is a side cross-sectional view showing another aspect of the headrest of FIG. 20 depicted in a deployed position.

FIGS. 21, 22 and 23 depict a modification to the slide mechanism 340 which enables a downward pivoting of the cushion 326 when the cushion 326 is in the fully extended position to accommodate shorter height users of the seat, such as small children.

The modification utilizes the recess 364 formed in the lower track 342 and a pivot member, such as a hinge 380, formed of a first hinge leaf 382 and a second hinge leaf 384 pivotally connected by a pivot pin 386. The first leaf 382 is fixedly connected to the bottom surface of the upper slider 344. The second hinge leaf 384 slides within the recess 364 and is captured within the recess 364 by the inward facing flanges 370 and 372 in the lower track 342.

In use, with the cushion 326 in the fully retracted position within the seat back 220, the first and second hinge leaves 382 and 384 will be in a collapsed position either in contact with each other or in non-contacting, but overlaying position. This allows normal sliding movement of the upper track 344 and the headrest 330 along the length of the lower track 342 between the retracted or extended positions.

After the headrest 330 has been pulled to the fully extended position, as shown in FIG. 22, a downward force can be exerted on the end 327 of the cushion 326. This downward force causes the hinge leaves 382 and 384 to separate, with the first hinge leaf 382 pivoting away from the second hinge leaf 384 which is held captured within the recess 364 in the lower track 342. This causes the entire headrest 330 to pivot about the hinge pin 386 bringing the front end portion 327 of the cushion 326 at a downward angle and at a lower position relative to the top edge of the seat back 220 to accommodate shorter height seat users, especially smaller children.

To retract the headrest 330, the headrest 330 is first pivoted upward bringing the upper slider 344 in line with the lower track 342. The upper slider 344 and the headrest 330 are then slid inward along the length of the lower track 342, as described above, until the fully retracted position is reached.

What is claimed is:
1. A headrest engageable with a seat back comprising:
a seat back mounting member mountable over a top edge of a seat back;
a cushion configured to engage one of a front and a side of a user's head to support a user's head;

a cushion connector coupling the cushion to the mounting member; and the mounting member and the cushion connector including a rod forming the cushion connector as a pair of cushion connector portions coupled to opposite ends of the cushion, and the rod forming the mounting member as a pair of mounting member portions engageable with a seat back, the mounting member portions and the cushion connector portions for disposing the cushion in an encircling manner about a front and sides of a user's head.

2. The headrest of claim 1 further comprising:

an enlarged plate coupled to the mounting portion of the rod for supporting the mounting portion of the rod on a surface of a seat back.

3. The headrest of claim 1 further comprising:

interlocking portions carried on opposite ends of the rod for releasably mounting the headrest about a seat back when the interlocking portions are interlocked.

4. The headrest of claim 1 wherein:

the rod is bendable to a plurality of user selectable positions each disposing the cushion at different angular positions relative to the seat back.

5. The headrest of claim 1 wherein:

the rod is bendable between a first discrete position and at least one second discrete position.

6. The headrest of claim 5 wherein the rod comprises:

a generally U-shaped channel adjacent each mounting member portion.

7. The headrest of claim 5 wherein:

one of the first and second positions of the cushion is a downward extending acute angular position of the cushion relative to the seat back.

* * * * *